US012125326B1

(12) United States Patent
Xenakis et al.

(10) Patent No.: US 12,125,326 B1
(45) Date of Patent: Oct. 22, 2024

(54) SYSTEMS AND METHODS FOR VISUALIZING VEHICLE DATA

(71) Applicant: Zoox, Inc., Foster City, CA (US)

(72) Inventors: David Xenakis, Missoula, MT (US); Jeffrey Ronald Pyke, Foster City, CA (US); Michael Owens, Santa Clara, CA (US); Chunlei Dai, San Jose, CA (US); Hao Li, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 359 days.

(21) Appl. No.: 17/506,474

(22) Filed: Oct. 20, 2021

(51) Int. Cl.
*G07C 5/08* (2006.01)
*B60W 50/10* (2012.01)

(52) U.S. Cl.
CPC ............. *G07C 5/085* (2013.01); *B60W 50/10* (2013.01); *G07C 5/0816* (2013.01); *B60W 2420/403* (2013.01)

(58) Field of Classification Search
CPC ..... G07C 5/085; G07C 5/0816; B60W 50/10; B60W 2420/42
See application file for complete search history.

(56) References Cited

U.S. PATENT DOCUMENTS

| | | |
|---|---|---|
| 6,553,290 B1 | 4/2003 | Pillar |
| 8,694,328 B1 | 4/2014 | Gormley |
| 8,832,304 B2 | 9/2014 | Traynor |
| 10,430,073 B2 | 10/2019 | Castaneda et al. |
| 11,623,517 B2 * | 4/2023 | Plante .................... G07C 5/085 701/32.2 |
| 2004/0172177 A1 * | 9/2004 | Nagai .................... G07C 5/085 701/33.4 |
| 2005/0074063 A1 | 4/2005 | Nair et al. |
| 2007/0100698 A1 | 5/2007 | Neiman et al. |
| 2009/0228462 A1 | 9/2009 | Frieder et al. |
| 2009/0276115 A1 | 11/2009 | Chen |
| 2010/0039247 A1 | 2/2010 | Ziegler et al. |
| 2010/0087981 A1 | 4/2010 | Orozco-Perez |

(Continued)

FOREIGN PATENT DOCUMENTS

CA 2644427 A1 1/2006

OTHER PUBLICATIONS

United States Non-Final Office Action dated Jun. 1, 2023 for U.S. Appl. No. 17/506,493.

(Continued)

*Primary Examiner* — Rami Khatib
(74) *Attorney, Agent, or Firm* — EIP US LLP

(57) ABSTRACT

Techniques and systems for testing, evaluating and/or otherwise assessing the operation of vehicles are discussed herein. Aspects relate to a system and method comprising receiving vehicle data derived from a vehicle data logging system, the vehicle data being associated with a vehicle run and comprising a plurality of data topics associated with a corresponding plurality of vehicle components and displaying the vehicle data with a timeline component of a user interface during playback of the vehicle run, the timeline component comprising a portion in the user interface and the portion being configurable with a start time and an end time. The vehicle data may comprise timing data for at least one of the data topics and the vehicle data may be displayed at points in time along the portion in the user interface corresponding to the timing data.

18 Claims, 14 Drawing Sheets

(56) References Cited

U.S. PATENT DOCUMENTS

| | | | |
|---|---|---|---|
| 2011/0187861 A1* | 8/2011 | Totani | G07C 5/0891 |
| | | | 348/148 |
| 2013/0249917 A1* | 9/2013 | Fanning | G06F 11/323 |
| | | | 345/440 |
| 2015/0105934 A1* | 4/2015 | Palmer | G07C 5/12 |
| | | | 701/1 |
| 2016/0037068 A1 | 2/2016 | Jenny et al. | |
| 2016/0304051 A1 | 10/2016 | Archer et al. | |
| 2016/0335292 A1 | 11/2016 | Tobin | |
| 2019/0132391 A1* | 5/2019 | Thomas | H04L 67/1097 |
| 2019/0236510 A1 | 8/2019 | Kwak | |
| 2020/0110394 A1* | 4/2020 | Hirata | G06Q 10/00 |
| 2020/0192872 A1* | 6/2020 | Quinn | G06F 16/24568 |
| 2020/0216089 A1 | 7/2020 | Garcia et al. | |
| 2020/0334125 A1 | 10/2020 | Degaonkar et al. | |
| 2021/0241926 A1 | 8/2021 | Chor et al. | |
| 2021/0312724 A1 | 10/2021 | Petri et al. | |
| 2022/0229120 A1* | 7/2022 | Goto | H01M 10/4285 |

OTHER PUBLICATIONS

United States Non-Final Office Action dated Dec. 1, 2023 for U.S. Appl. No. 17/506,452.
United States Notice of Allowance dated Apr. 10, 2024 for U.S. Appl. No. 17/506,493.
United States Final Office Action dated Apr. 11, 2024 for U.S. Appl. No. 17/506,452.

\* cited by examiner

SYSTEMS AND METHODS FOR VISUALIZING VEHICLE DATA

BACKGROUND

Testing, evaluating and/or otherwise assessing the operation of vehicles may involve visualizing the output of sensors and/or software components operating on the vehicles during a vehicle run. For example, the output of such sensors and/or software components during such a vehicle run may be visualized using a user interface.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques and components for aggregating views of a vehicle run are described herein. Such techniques and components can be used to visualize vehicle data that are generated during a vehicle run. Using the techniques and components described herein, operations of logical components such as sensors and software components on a vehicle can be examined, reviewed, assessed or otherwise debugged. As will be described in more detail below, the components may comprise user interface components running on a client system and that cooperate with server systems to collectively present vehicle data from a vehicle run in an intuitive manner, effectively functioning as a portal to view the functioning of vehicle components during a vehicle run. The vehicle data may comprise vehicle data in the form of vehicle diagnostics and/or vehicle log data and/or video data.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data.

Figure 1:
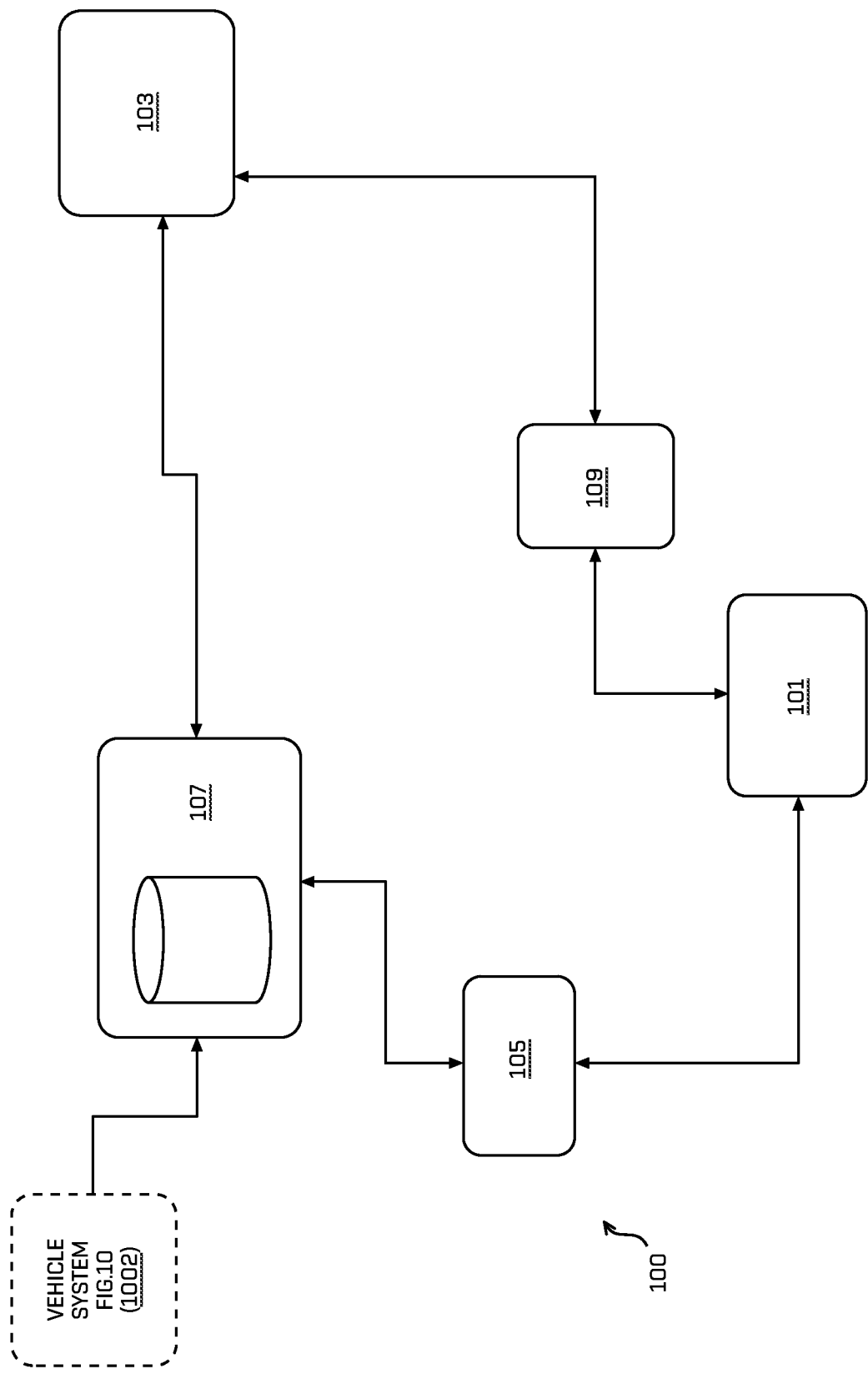
FIG. 1 is a schematic block diagram showing components of a system for aggregating views of a vehicle run as described herein

FIG. 1 is a schematic block diagram showing components of a system 100 for aggregating views of a vehicle run as described herein. The system 100 comprises a client system 101, which can communicate with first server 103 and second server 105 to request and display vehicle diagnostics data and/or vehicle log data and/or video data. The first server 103 may be a web server and the second server 105 may be a transcoding server. Each of the first and second servers 103, 105 can communicate with storage system 107, which ingests data from vehicle system 1002. Aspects of the client system 101 will be described with reference to FIG. 2-FIG. 7, while aspects of the first server 103 will be described with reference to FIG. 8 and aspects of the second server 105 will be described with reference FIG. 9

Client System 101

Figure 2:
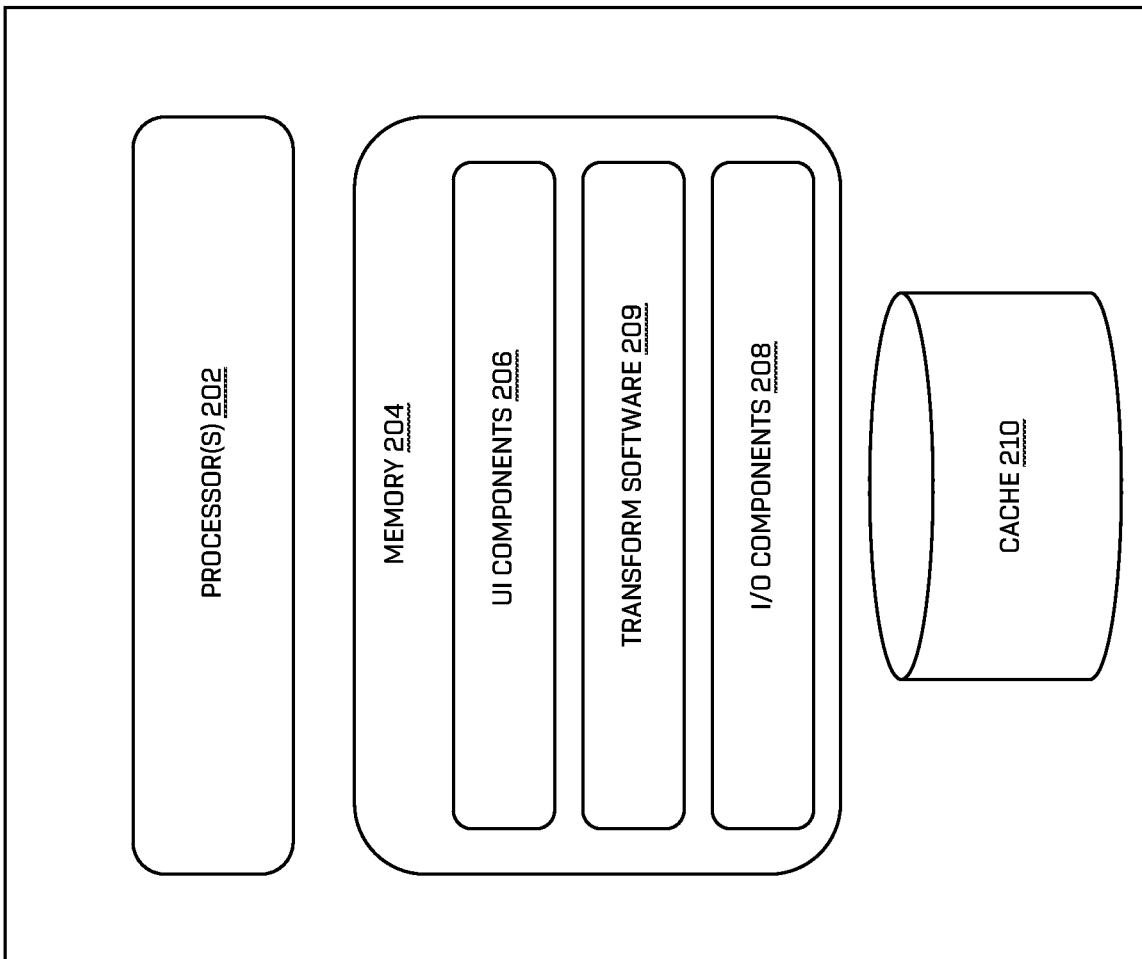
FIG. 2 is a schematic block diagram showing components of the client system of FIG. 1

Referring to FIG. 2, embodiments of the client system 101 may generally comprise UI components 206 and I/O components 208, which are stored in memory 204 of the client system and executed by one or more processor(s) 202 of the client system 101. In some examples, the UI components 206 may take the form of a web application, which executes in a web browser. The I/O components 208 may be operating system components, which are invoked by the UI components 206, using standard operating system calls.

The UI components 206 may receive vehicle data, for example vehicle diagnostics data, that has been derived from a vehicle data logging system such as the vehicle system 1002 shown in FIG. 1, for one or more vehicle runs. The vehicle data may be received via the I/O components 208. The vehicle data may be derived from a plurality of data topics associated with a corresponding plurality of vehicle components of the vehicle system 1002. Examples of such vehicle components include sensor components and software components. These will be described in detail below with reference to FIG. 10, but in overview each vehicle component may serialize its output and publish the output to data topics. Equally, components may subscribe to data topics published by other components. For example, a perception software component on the vehicle 1000, which may use perception algorithms to determine a bounding box associated with an object, may subscribe to data topics published by a camera sensor component, and may in turn publish to data topics that are associated with e.g. a bounding box that is computed for the vehicle. As will be described in more detail below, each data topic may comprise many types and/or fields of data, each of which may be associated with a time (referred to herein as a topic generation instance time). The data topics may be hierarchically arranged such that, for example, vision or other sensor topics may be hierarchically situated under a perception and/or vehicle component topic. In order to make efficient use of available bandwidth and processing resources, the UI components 206 may request and display particular data topics and further, a subset of data items of the particular data topics rather than all of the data topics and all data items of the data topics. Further details of this efficient selection of vehicle data will be described below with reference to FIGS. 6-7.

First, certain aspects of how vehicle data are processed in order to playback vehicle data from a vehicle run will be described. In some examples the UI components 206 may display the vehicle data with a timeline component of a user interface during playback of the vehicle run. The timeline component may comprise a portion having two ends, which is displayed in the user interface, one end of which is configured with a start time and the other end of which is configured with an end time. The vehicle data may comprise timing data for at least one data topic, and the UI components 206 may parse the vehicle data in order to display the data topics at points in time along the portion corresponding to the timing data. The start and end times of the portion may be those of the vehicle run and may be configured by a user via a suitable data entry portion and/or be derived by the UI components 206 from the timing data.

Figure 3:
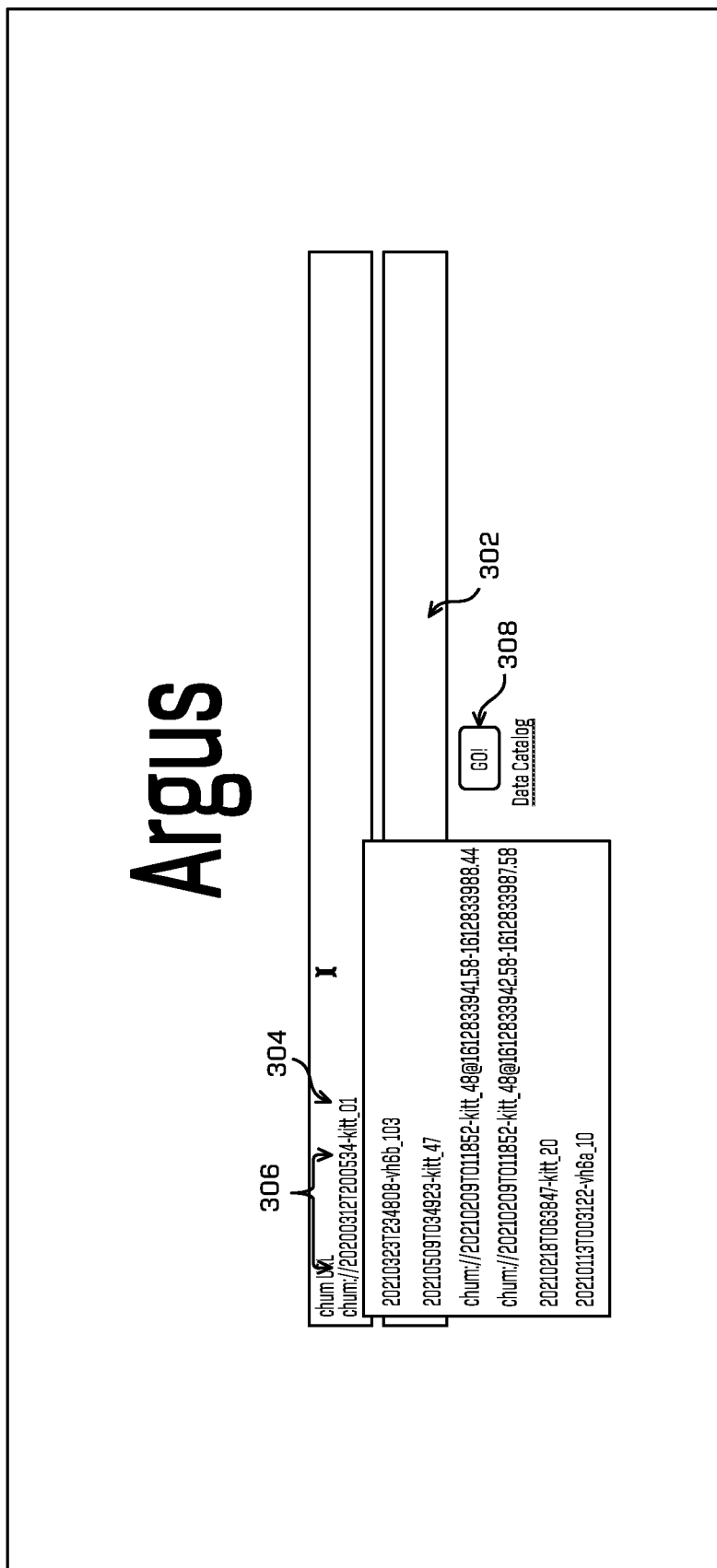
FIG. 3 depicts a user interface generated according to embodiments disclosed herein.

FIG. 3 shows an exemplary user interface 301 generated by the UI components 206 for use in identifying a vehicle run for visualization. The user interface 301 may comprise a data entry portion 302 into which a user enters data 304 identifying a particular vehicle and a date and time 306 of a vehicle run for that vehicle. The user interface 301 may further comprise a button 308, which, when selected, can result in a request being sent to the first server 103 via the I/O components 208 for data corresponding to the vehicle run. In this example the vehicle identified is kitt_01 and the run is one that occurred on Mar. 12, 2020, at UTC T200534 (where in this example the UTC time indicates the $34^{th}$ second of the $5^{th}$ minute of the $20^{th}$ hour on Mar. 12, 2020). In this example the request is configured as a URI, which is advantageous because the vehicle, run and time range data can all be coded into a single HTTP request, which reduces the number of calls to the server side components that would otherwise be required to request the same information.

Figure 4:
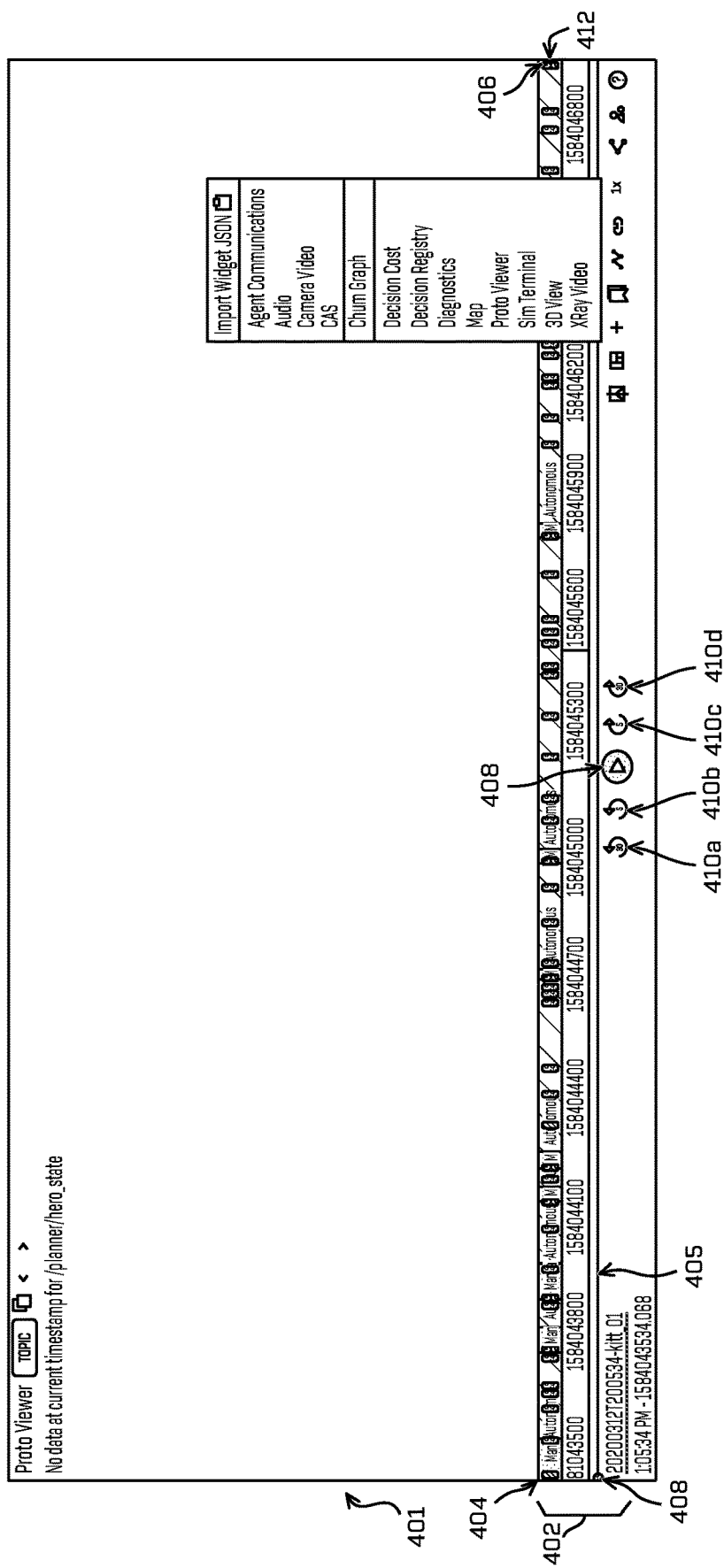
FIG. 4 depicts a user interface generated according to embodiments disclosed herein.

FIG. 4 shows an exemplary user interface 401 generated by the UI components 206 for vehicle data that are received for this vehicle run. The UI components 206 may generate timeline component 402 that may occupy a bottom portion of the user interface 401 and can be configured with a start time of the run at one end 404, and an end time of the run at the other end 406. The timeline component 402 may also comprise a time bar part 405, which extends between end 404 representing the start time and end 406 representing the end time of the vehicle run. The time bar part 405 may be updated to indicate specific time points in the selected vehicle run. The updating can occur in response to a user selecting and dragging, or otherwise moving, playback indicator 408 to a specific point along the time bar part 405. Alternatively, and/or additionally the updating can occur under control of the UI components 206, for example as a user is viewing playback of the vehicle data. Further, the updating can occur under control of the UI components 206 as a user is viewing playback of the vehicle data in conjunction with other data topics via a set of widgets as will be described in more detail below with reference to FIG. 7. The timeline component 402 may also comprise timeline Graphical User Interface (GUI) control elements 410a . . . 410d, which provide input to the UI components 206 in order to restart, advance, forward or otherwise control playback of the vehicle data.

Figure 5:
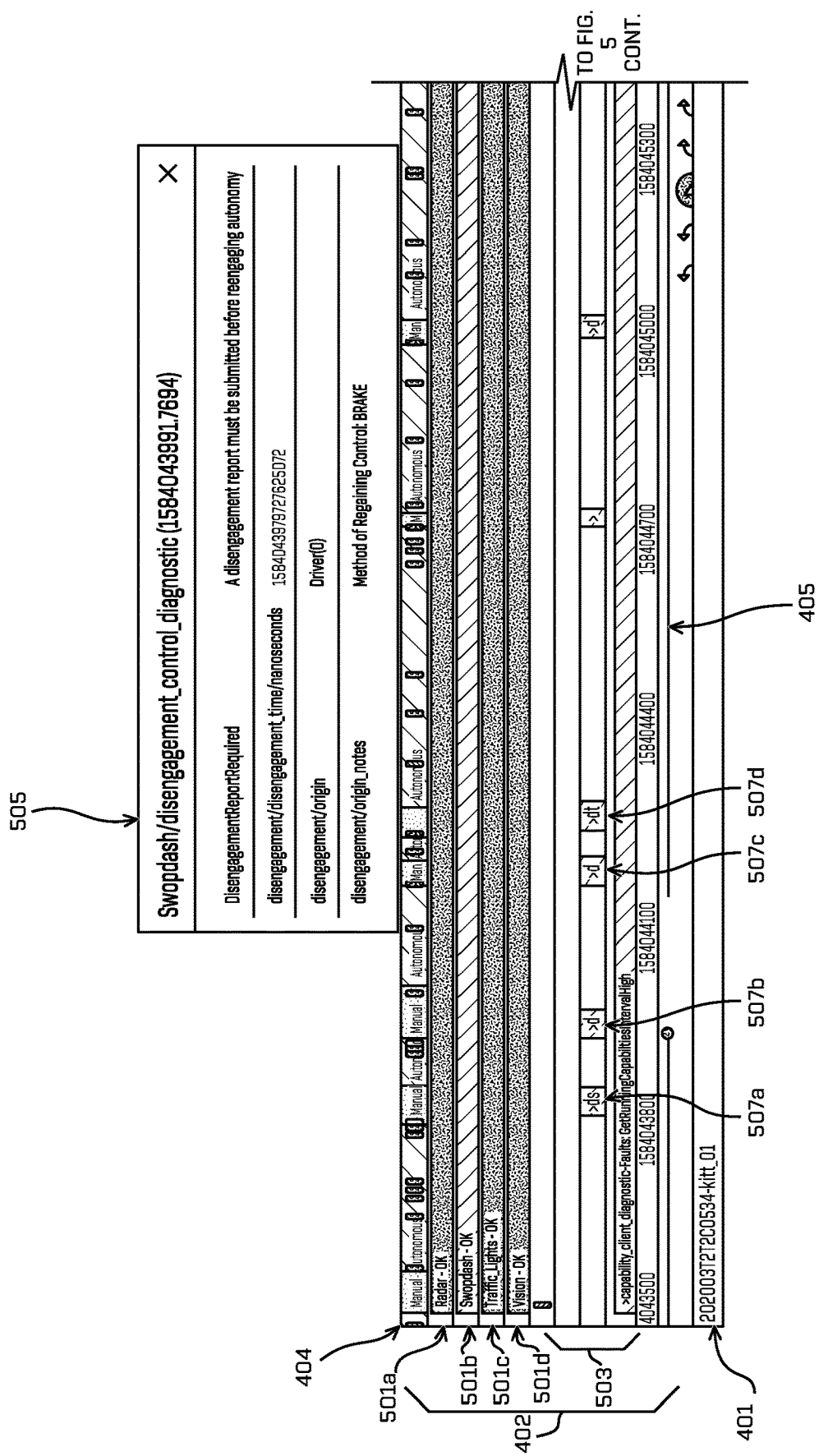
FIG. 5 depicts a user interface generated according to embodiments disclosed herein.
Figure 5:
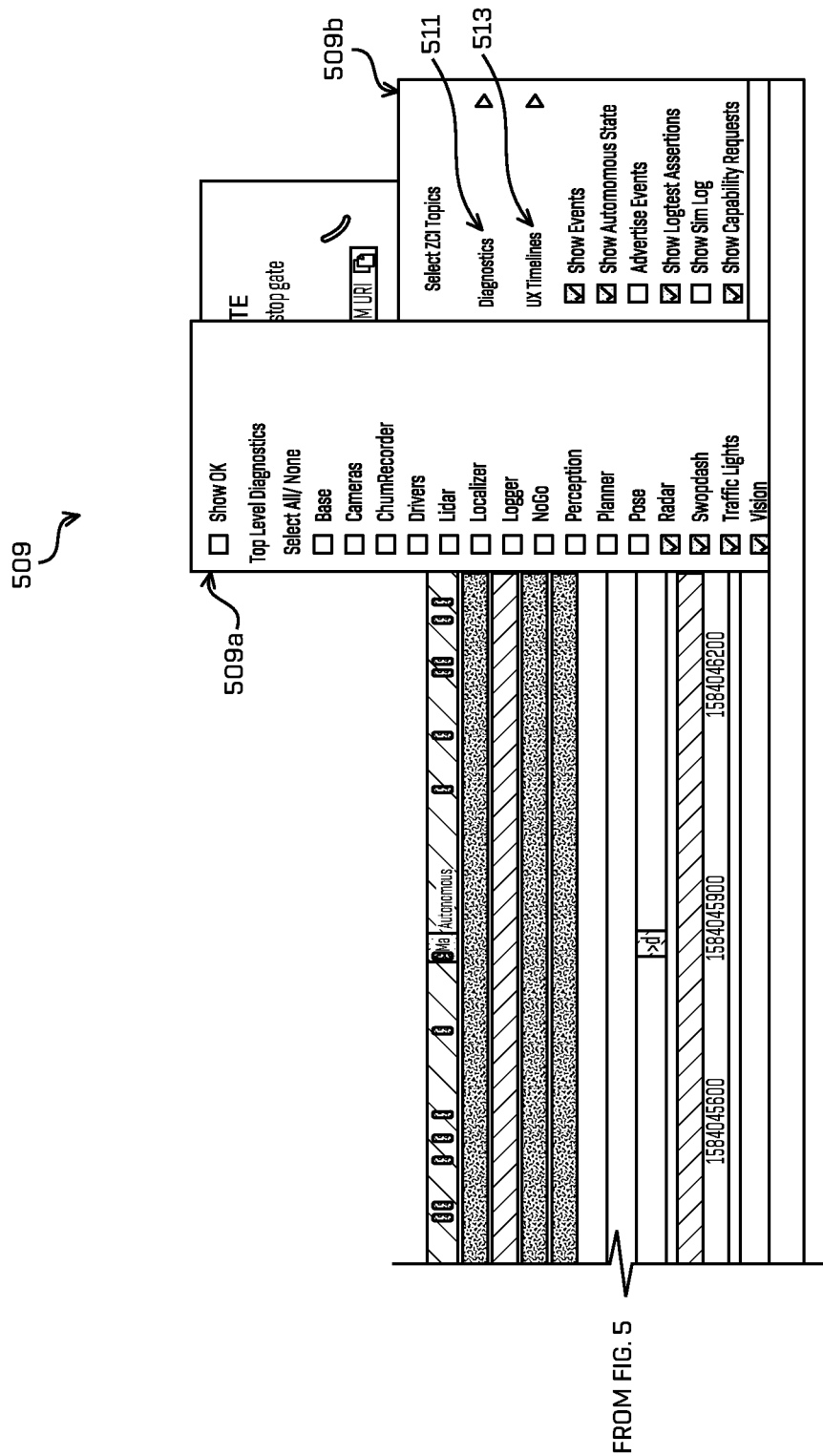

Referring now to FIG. 5, the UI components 206 may display vehicle data in the timeline component 402, at time points corresponding to the timing data of data topics making up the vehicle data. In one example the data topics may be arranged in accordance with a hierarchical structure, comprising higher-level diagnostics data, 501a . . . 501d, and lower-level diagnostics data 503. In this example the diagnostics data are shown for software component Swopdash, which is an on vehicle UI component used by an operator in the vehicle 1000, and which may publish events recorded during a vehicle run to data topics as briefly explained above. The higher-level diagnostics data 501b for Swopdash may comprise metadata 505 identifying high level information for certain data items of the data topics published by Swopdash, where those data items have been selected by the user via expandable GUI element 511 entitled "diagnostics" as will be described in more detail below. The lower-level diagnostics data 503 may comprise time-stamped information for the selected diagnostic data items. The hierarchical data topic may be configured as key-value pairs, such that the values of a given hierarchical data topic are parsed when needed.

Generally, there can be a diagnostics component for each logical component on the vehicle 1000, which is to say there may be a diagnostics component for each software and hardware component of the vehicle 1000, or logical grouping thereof. Examples of other diagnostics components include Radar (which could be a hardware or software component on the vehicle 1000, and which may publish warnings to data topics), Traffic_Lights (which may be a software component on the vehicle 1000 that tracks the health of components of the vehicle and which may publish health information to data topics) and Vision (which may be a software component that subscribes to and processes e.g. data topic output from a camera component on the vehicle 1000, applies machine learning to that output and may publish e.g. bounding box information to a data topic). As will be described in more detail below with reference to FIG. 10, additional diagnostics components may include Localization (determining a location of a vehicle using onboard sensors), Planning (high-level determination of autonomous driving features), Perception (characterization and/or classification of an environment or objects therein, specifically in proximity to a vehicle which may include radar, vision, lidar, microphones, etc.), Prediction (predicting perceived object(s) future behavior), Collision Avoidance (safety systems that may work independently of the Planner to prevent a vehicle from maneuvering in an unsafe manner), Communications (features of a vehicle that may be used to communicate with persons in proximity to a vehicle including audio, lights, display panels, etc. or remotely via, for example, cellular or other data link(s)), and Vehicle Platform (low level functions of a vehicle including drive modules, steering modules, battery modules, charging systems, door control, heating, cooling, and ventilation, etc.). The preceding are exemplary diagnostics components and others and/or other hierarchical models of components are contemplated.

In certain examples, a diagnostics component can be populated by data from a vehicle run stored in topic or time-based hierarchical structure as disclosed herein. This can include, for example, determining corresponding data to populate the diagnostics component via corresponding topic(s). For example, a diagnostic component may focus on perception data and a corresponding topic may include lidar, radar, vision, microphone, and/or perception processing components/information stored from a vehicle run. In examples, a given diagnostics component may process data stored from vehicle runs to determine diagnostics information. The diagnostics information may summarize or analyze data gathered from vehicle runs to, for example, display a faulted component and/or a certain type of fault. The diagnostics information can, for example, determine that a sensor is faulted either by a direct fault code or by analyzing sensor output(s) that are inconsistent with a functioning sensor. In other words, a diagnostics component may perform addition analyses than may be available from on-board vehicle diagnostics by, for example, performing more holistic or in-depth analyses.

The analyses may include gathering information from a plurality of topics. For example, determining a fault in a braking system may include analyzing sensor data, perception data, vehicle brake component information, and/or sensor backup data. In examples, a topic for a certain vehicle or run may be associated with faults and may be populated based on the preceding analysis. In this manner, fault data can be stored associated with a vehicle run to avoid performing analyses again in the future which may include appending to an existing vehicle log.

A vehicle log may also be appended to with additional or other information using the techniques disclosed herein. For example, a certain widget or graphic representation may be generated and/or intermediate data be generated to support the widget or graphic. This information may be stored in the vehicle log in a topic, for example. As an example, a client computer may generate a model for an object perceived from sensor data. The model may be used for visualizations or other purposes. The model or characteristics thereof may be stored in a vehicle log. The determination as to whether to store the fault, vehicle log, or other data may be based on a predicted use of the data to be stored, a degree of complexity of the data generation, or a combination thereof. For example, it may be determined that many users are or will likely access a widget requiring the use of a certain model which may thereof be stored via a vehicle log as disclosed herein.

In examples, logs from a vehicle may reference data stored within the log of another. For example, multiple logs may be associated with a single vehicle that may have a faulted component. The multiple logs may correspond to respective time periods of operation of the vehicle. These logs may be appended to or otherwise cross reference each other with pointers to topics with other logs. For example, a fault may be populated or referenced after having been detected in future logs and removed after the corresponding vehicle is serviced to avoid the fault. Similarly, model data may be appended to or otherwise referenced for a series of logs for a vehicle and/or for logs pertaining to an area that the model is used (e.g., logs captured in a geographically and/or temporally similar area).

Returning to FIG. 5, the UI components 206 may include GUI element 509 in the form of cards, which enable selection from a primary card 509a of higher-level diagnostics to include in the timeline component 401, where these higher-level diagnostics data have been published as data topics by components of the vehicle 1000 as described above. The GUI element 509 may also include a secondary card 509b, which may be used to select a subset of data items of the data topics published by the components shown in the primary list via expandable GUI element 511 entitled "diagnostics", as described above for the example of the Swopdash diagnostics component.

UI components 206 may display the higher-level metadata 505 in response to a user input device scrolling over a region of the user interface corresponding to the higher-level diagnostics data for Swopdash 501b. In response to selection via the user interface of that region corresponding to Swopdash 501b, the UI components 206 may parse and subsequently display the lower-level diagnostics information 503 making up the selected subset of data topics published by Swopdash 501b. As such, the timeline component may comprise a main timeline part, which is configured to display the higher-level diagnostics data (region encompassing 501a . . . 501d), and a subsidiary timeline part (region encompassing 503), which is for displaying the lower-level diagnostics data.

For the example shown in FIG. 5, and for the exemplary higher-level diagnostics data for Swoopdash 501b, it can be seen that the lower-level diagnostics data are distributed along the timeline component 402 at time points 507a . . . 507d (only four are labelled for clarity). In this example the lower-level diagnostics data 507a . . . 507d may comprise vehicle state data, for example in the form of manually entered events generated by an assistance operator using Swopdash during the vehicle run. These enable a user to identify, at a glance, points in time during the vehicle run at which an event occurred. While in this example one of the exemplary higher-level diagnostics data has been selected (corresponding to component Swopdash 501b), resulting in the UI components 206 displaying the lower-level diagnostics data published by Swopdash 501b in the subsidiary timeline part 503, it will be appreciated that the UI components 206 may display more than one subsidiary timeline part in the user interface 401, for example for as many higher-level diagnostics data as have been selected via a suitable group selection GUI function (not shown).

Referring back to FIG. 2, the client system 101 may comprise a store in the form of a cache 210, into which the vehicle data may be received for access by the UI components 206. When the vehicle data comprises hierarchical data topics configured as key (higher-level diagnostics data), value (lower-value diagnostics data) pairs, the UI components 206 may then retrieve the lower-level diagnostics data from the cache 210 in response to user input and display the retrieved the lower-level diagnostics data in the subsidiary timeline part (region encompassing 503) as described above. In some examples, a hierarchy used for displaying timeline or diagnostics components may correspond to topic hierarchies of vehicle logs. For example, a displayed component can correspond to a fault of a perception system whereas a lower level component may correspond to a sensor fault. A similar methodology can be applied to topics organized by time, for example. In some examples a portion of the vehicle data for the selected vehicle run may be received into the cache 210, with other portions of the vehicle data being received separately, based on playback of the vehicle diagnostics data and/or vehicle log data, as will be described in more detail below.

Referring back to FIG. 4, the timeline component 402 may include an event timeline part 412, in which events relating to the vehicle run are displayed. The events may also comprise events indicating that the vehicle is in autonomous state and events indicating that the vehicle is in an inactive state. The different types of events may be distinguished in the event timeline part 412 via visual indicators such as colours; in the example of FIG. 4 green indicators indicate that the vehicle is operating in an autonomous state, grey/black indicators indicate that the vehicle is in an inactive state, while pink indicators indicate a manually generated event. The vehicle state data received by the UI components 206 may additionally include metadata corresponding to the event data, which can be reviewed by a user by hovering over a given indicator (not shown).

In the example shown in FIG. 5 the main timeline part (region encompassing 501a . . . 501d), and the subsidiary timeline part (region encompassing 503) are vertically aligned with each other. Further, these parts may be aligned with the event timeline part 412 and with the time bar part 405 in the user interface 401. These parts may collectively be described as stacked within the user interface 401. Other arrangements are envisaged. For example, in one arrangement the main timeline part corresponding to the higher-level diagnostics data may be displayed in another portion of the user interface 401 by a widget rather than as part of the timeline component. As a further alternative, when the vehicle data comprises data topics with no hierarchical diagnostics data, each of the data topics may be displayed in the main timeline part, e.g. as is shown for components Radar, Swopdash, Traffic_Lights and Vision 501a . . . 501d in FIG. 5 but without a subsidiary timeline part.

Figure 6:
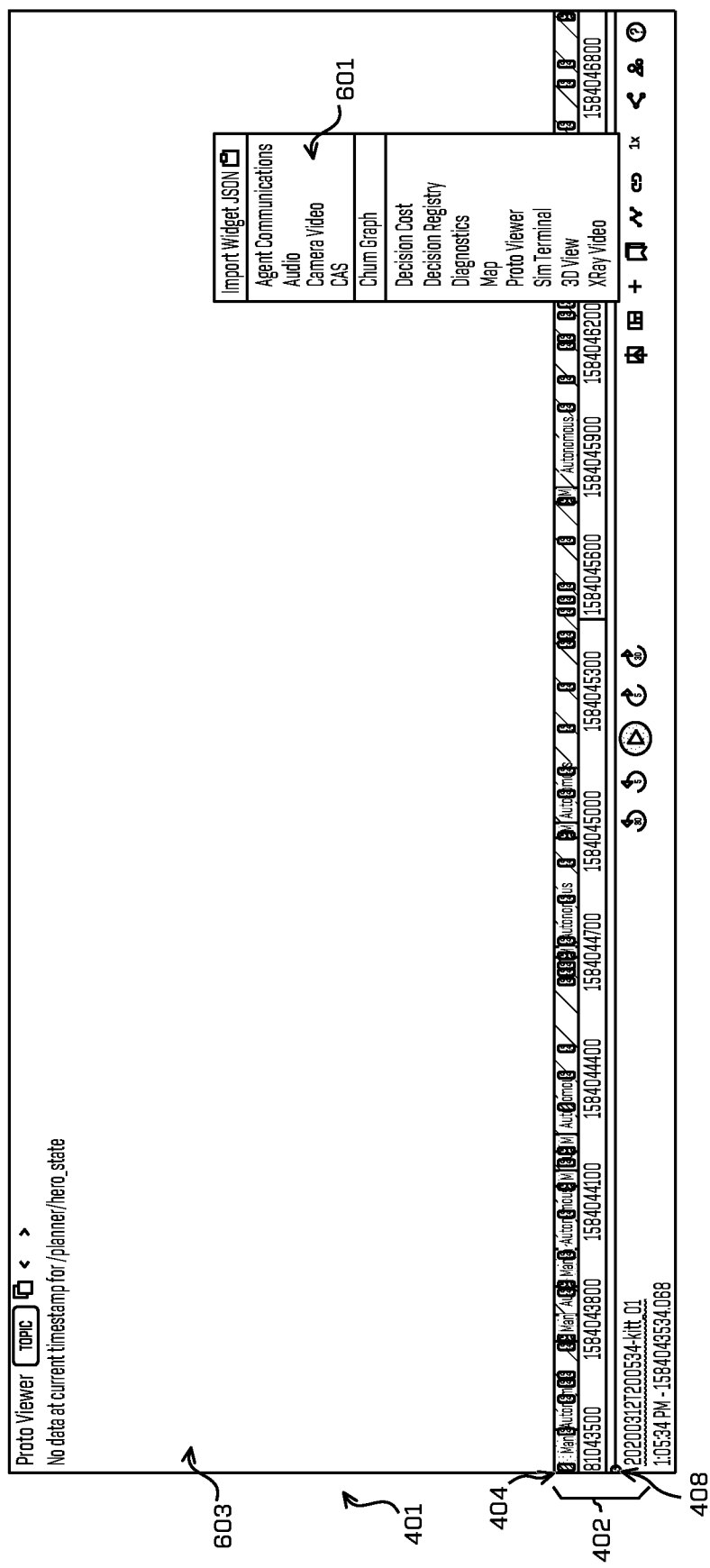
FIG. 6 depicts a user interface generated according to embodiments disclosed herein.

Referring now to FIG. 6, the UI components 206 may receive user interface configuration data, from which a user interface configuration for a set of widgets can be derived. The user interface configuration data may, for example, be a selection of widgets that are to execute in an aforementioned web application, which executes in a web browser. The widgets may be selected via Graphical User Interface (GUI) elements displayed in the web browser, such as a pick list 601. In this example a single widget, "Proto Viewer", has been selected, causing the UI components 206 to assign a window portion 603 within the user interface 401 to the Proto Viewer widget. As will be described below, in some examples, the user interface configuration data may include configuration data indicating how the UI components 206 may interact with stored vehicle data in the disclosed topic or time-based hierarchical structure. For example, the configuration data may indicate that a UI component may retrieve data from a certain level of the hierarchy or from a certain component of the vehicle. In examples, the retrieval of data from the topics may not be specified in the URI and the UI component itself may be configured to retrieve information from prespecified location(s). The URI may be used if, for example, these default locations are modified by a user and this is shared with other users for recreation of the run with the modified location.

The UI components 206 may receive vehicle log data that has been derived from a vehicle logging system such as the vehicle system 1002 shown in FIG. 1, for one or more vehicle runs. The vehicle log data may be received via the I/O components 208. In response to receipt of the vehicle log data, the set of widgets may display one or more visualizations based on the received vehicle log data. Remaining with FIG. 6, in this example the playback indicator 408 in time bar part 405 of the timeline component 412 is positioned at end 404, meaning that in terms of the selected vehicle run, time is zero. Therefore, at time zero there is no vehicle log data to be processed by the widget "Proto Viewer", as indicated at the top of window portion 603.

Figure 7:
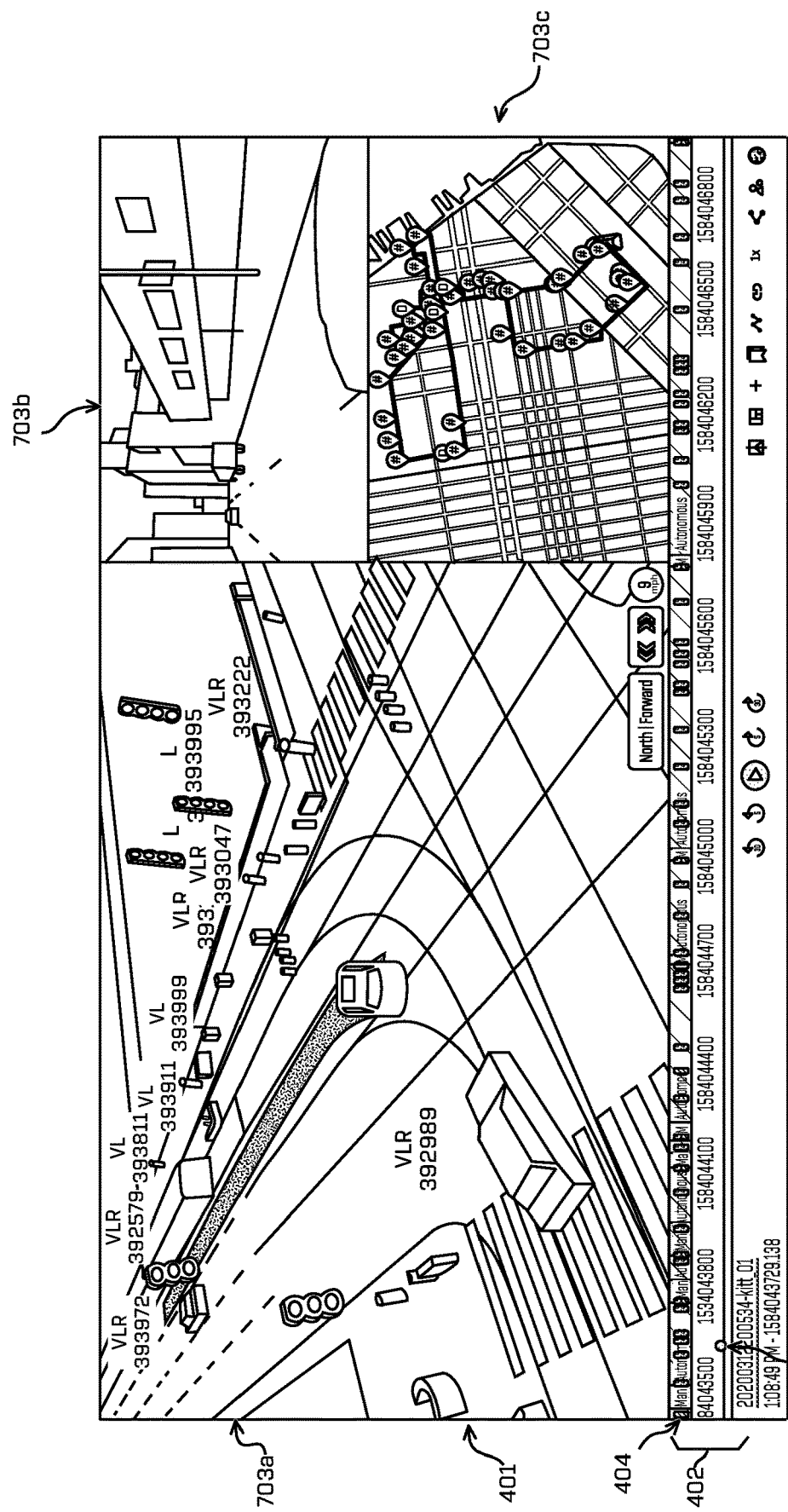
FIG. 7 depicts a user interface generated according to embodiments disclosed herein.

FIG. 7 shows an example user interface configuration for a set of widgets comprising 3 widgets, namely "Visualization" widget, "CameraVideo" widget and "Map" widget. In this example, playback indicator 408 is located at a position along the time bar part 405 that corresponds to a time after the start of the run. Therefore, in this example, the widgets are processing the received vehicle log data, resulting in a visualization based at least in part on the vehicle log data. Each widget can be assigned a window portion 703a, 703b, 703c within the user interface 401 by the UI components 206. The parameters that define configuration of these window portions 703a, 703b, 703c may be referred to as widget layout data.

The UI components 206 may generate a shareable data structure, which identifies the vehicle log data and comprises playback information and widget layout data that corresponds to the user interface configuration. For example, the shareable data structure may comprise a URI, and more particularly a URL, which embeds data identifying the vehicle run for which the vehicle log data have been received, the specific time corresponding to the playback indicator 408 along the time bar part 405, any widgets that have been selected, and display parameters for use in displaying the selected widgets in a user interface such as a web browser. The URL may take the general form: https://{subdomain}/uri?{run-id}{playback_time_point} {encoded_layout_parameters}, and for the exemplary user interface configuration shown in FIG. 7, the URL may be:

https://argus.zooxlabs.com/uri?primaryUri=chum %3A %2F %2F20200312T200534-kitt_01&time= 1584043729.1382933&layout=eyJsYXlvdXQiOiJwc- mltYXJ5U2Vjb25kYXJ5Iiwid2lkZ2V0cyI6W3sibm Ft ZSI6IlZpc3VhbG16YXRpb24iLCJvcHRpb25zIjp7 ImNhbWVyYUZpeGVkIjp0cnVlLCJzaG93U3Rhd GljR3JpZCI6dHJ1ZSwibGluaHR3ZWInaHR TdGF0aWNHcmlkIjp0cnVlLCJzaG93RGVjaXNp b24iOn RydWUsInNob3dEZWNpc2lvbk VudG10e Ulu dGVy YWNOaW9ucyI6dHJIZSwic2hvd0RIY2lza W9uQ29ycmlkb3IiOnRydWUsInNob3dTbW9vdGh IZENvcnJpZG9yIjp0cnVlLCJzaG93TWlzc2lvb lBvaW50cyI6dHJIZSwic2hvd0RIY2 1za W9uVHJha mVjdG9yeSI6dHJIZSwic2hvd1ByZWRpY3Rpb25 UcmFja3MiOnRydWUsIn Nob3dUdXJuU2lnbmFscy I6dHJ1ZSwiY29uc3RydWN0aW9uT2JzdGFjbGVzIj p0cnVlfSwiZ 3JpZE9wdGlvbnMiOnsiaCI6Niwid yI6NCwieSI6MCwieCI6MH19LHsibmFtZSI6IkNhb WVy YVZpZGVvliwiib3B0aW9ucyI6eyJjYW1lcmF JZElhcCI6e30sImFubm90YXRpb25PcHRpb2 4iOiJO b25lliwicmVzb2x1dGlvbk9wdGlvbiI6IkR5bmFta WMgUmVzliwienJuUm9hZFByb2p1Y3Rpb25zIjpm YWx zZSwienJuQWSub1Byb2p1Y3Rpb25zIjpm YWxzZSwienJuVGxQcm9q ZWNOaW9ucyI6ZmFs c2UsInBIZEF0dHJWaXoiOmZhbHNILCJ2ZWhpY2 xITGlnaHRzVml 6Ijpm YWxzZSwidXNIQ29tcGF yaXNvblVyaSI6ZmFsc2V9LCJncmlkT3B0aW9ucyI 6eyJ4Ijo 0LCJ5IjowLCJ3Ijo0LCJoIjo2fX0seyJuY W1IIjoiTWFwliwiib3B0aW9ucyI6eyJzaG93RXZlbn RzIjp0cnVlLCJ1c2VDb21wYXJpc29uVXJpIjpmY WxzZX0sImdyaWRPcHRpb25zIjp7IngiO jgsInkiO jAsInciOjQsImgiOjZ9fV0sInBsYXliYWNNrUmF0ZSI 6MSwidGltZWxpbmVTdGF0 ZSI6eyJ6Y2kOnsi c2VsZWNOZWRaY21Ub3BpY3MiOltdfSwiZGlhZ2 5vc3RpY3MiOnsic2 VsZWN0ZWREaWFnbm9zd GljcyI6W10sImV4cGFuZGVkRGlhZ25vc3RpY3Mi OltdLCJhY 3RpdmVMZWFmIjpudWxsLCJzaG93T 2tEaWFnbm9zdGljcyI6ZmFsc2V9LCJhZHZlcnRpc 2VFdmVudHMiOmZhbHNILCJzaG93RXZlbnRzIjp0 cnVlLCJzaG93QXV0b25vbW91c1N0Y XRIIjp0cn VILCJzaG93TG9ndGVzdEFzc2VydGlvbnMiOmZhb HNILCJzaG93Q2FwYWJpb G10eVJlcXVlc3RzIj pmYWxzZSwic2hvd1NpbUxvZyI6ZmFsc2UsImdy b3Vwc09yZGVyIjpb XSwic2VsZWN0ZWRVWEJl aGF2aW9ycyI6W10sInNlbGVjdGVkVVhFdm VudH- MiOltdfS wiY29udHJvbHNTeW5jaHJvbml6Z WQiOnRydWUsInN5bmNocm9uaXplZCI6W119

This base-64 encoded version of the URL may be shortened to produce http://z.zooxlabs.com/argus-20200312T200534-kit_01-0659c in this example by the UI components 206, e.g. using a shortening service which stores the layout parameters and redirects the UI components 206 to the full layout (base-64 encoded) version.

The UI components 206 may decode the time part of the URL and then parse the time data. By way of example only, the time parameter "&time=" encodes the precise playback time of the vehicle run corresponding to the playback indicator 408 along the time bar part 405. In the exemplary URL above this playback time is 1584043729.1382933. It will be understood that for a given set of widgets and vehicle run, this time parameter changes as playback of the vehicle run progresses.

The UI components 206 may also decode the layout part of the URL and then parse the layout data. By way of example only, the layout parameter "&layout=" encodes the following user interface layout information:

```
{
  "layout": "primarySecondary",
  "widgets": [
    {
      "name": "Visualization",
      "options": {
        "cameraFixed": true,
        "showStaticGrid": true,
        "lightweightStaticGrid": true,
        "showDecision": true,
        "showDecisionEntity Interactions": true,
        "showDecisionCorridor": true,
        "showSmoothedCorridor": true,
        "showMissionPoints": true,
        "showDecisionTrajectory": true,
        "showPredictionTracks": true,
        "showTurnSignals": true,
        "constructionObstacles": true
      },
      "gridOptions": {
        "h": 6,
        "w": 4,
        "y": 0,
        "x": 0
      }
    },
    {
      "name": "CameraVideo",
      "options": {
        "cameraIdMap": { },
        "annotationOption": "None",
        "resolutionOption": "Dynamic Res",
        "zrnRoadProjections": false,
        "zrnAnnoProjections": false,
        "zrnTlProjections": false,
        "pedAttrViz": false,
        "vehicleLightsViz": false,
        "useComparisonUri": false
      },
      "gridoptions": {
        "x": 4,
        "y": 0,
        "v": 4,
        "h": 6
      }
    },
    {
      "name": "Map",
      "options": {
        "showEvents": true,
        "useComparisonUri": false
      },
      "gridOptions": {
        "x": 8,
        "y": 0,
        "v": 4,
        "h": 6
      }
    }
  ],
  "playbackRate": 1,
  "timelineState": {
    "zci": {
      "selectedZciTopics": [ ]
    },
    "diagnostics": {
      "selectedDiagnostics": [ ],
      "expandedDiagnostics": [ ],
      "activeLeaf": null,
      "showOkDiagnostics": false
    }
    "advertiseEvents": false,
    "showEvents": true,
    "showAutonomousState": true,
    "showLogtestAssertions": false,
    "showCapabilityRequests": false,
    "showSimLog": false,
    "groupsOrder": [ ],
    "selectedUXBehaviors": [ ],
    "selectedUXEvents": [ ]
  },
  "controlsSynchronized": true,
  "synchronized": [ ]
}
```

The first portion, "widgets", specifies layout parameters for the widgets that have been selected via the picklist 601 and instantiated into the user interface 401; the second portion, "playbackRate" is a parameter that is for use in controlling playback of the vehicle log data by the widgets, the use of which will be described in more detail below. The third portion, which starts with "timelineState", lists parameters for configuration of the timeline component 402: in this example "selectedDiagnostics" may correspond to the aforementioned main timeline part for higher-level diagnostics data 501*a* . . . 501*d* and "expandedDiagnostics" may correspond to the afore-mentioned subsidiary timeline part for lower-level diagnostics data 503. The other "timelineState" parameters represent settings that may be configured for the timeline component 402 by way of Boolean flags and objects representing UI elements of the timeline component 402; for example, referring back to FIG. 5, these may be configured by the user via GUI element 513. By encoding playback time point and widget layout data within a shareable data structure such as a URI, the vehicle state and diagnostics configuration shown in FIG. 7 can easily be shared with other users who have access to system 100, simply by sending the URI to those other users.

Without limitation, the set of widgets may include camera widgets, 2D and 3D visualization widgets, audio widgets, map widgets, diagnostics widgets, communication widgets, plot widgets, simulation widgets, 2D, 3D and Xray video widgets.

As mentioned above, the widgets may process vehicle log data that have been received into the cache 210. The vehicle log data may originate from the vehicle system 1002, specifically components on the vehicle system 1002. As briefly explained above and will be explained in more detail below with reference to FIG. 8 and FIG. 10, each such component may serialize its output and publish the output to data topics for a vehicle run. Each data topic may comprise many types and/or fields of data, each of which has a topic generation instance time, and the widgets typically display just a subset of all fields making up the data topic. Accordingly, to make efficient use of bandwidth and processing resources, each widget can be configured to request a subset of data items of one or more data topics making up the vehicle log data. The subsets of data items requested by the widgets may be referred to as whitelists of data items for the data topics.

As such, widgets can be said to be characterized by the particular subset, or whitelist, of data items for the data topics that they request. To take one example, the afore described "visualization" widget visualizes a representation of the vehicle together with representations of objects observed and/or sensed during the vehicle run, projected onto a representation of the road and surrounding environment, as is shown occupying window portion 703a of FIG. 7. In this example the data topics requested by the "visualization" widget may include data published by e.g. LIDAR sensors to the vehicle system 1002. Further, the data topics requested by the visualization widget may include data published by machine learning algorithms executing on the vehicle system 1002, which take as input the data topic published by the LIDAR sensors, and which may publish e.g. a data topic for a bounding box representing objects. The data topics requested by the visualization widget may also include data topics representing the road and surrounding environment.

As should be understood, a widget may retrieve data from a plurality of data topics and may perform further processing on data retrieved from the data topics. For example, the data from the data topics may include data for perceived objects in the environment that a vehicle may not take into account when planning its trajectory through an environment. A widget may perform a visualization and/or analysis on such objects to determine their effect on other objects that, for example, the vehicle may interact with. Such analyses may be beyond the reasonable purview of the vehicle due to memory or processing constraints. As another example, a widget may be used to analyze data across data topics to determine if vehicle systems may be improved using alternate techniques. For example, a result in a data topic may be compared to data in other, e.g., lower level data topics, to determine if the result can be calculated in an alternate or more accurate manner.

Referring back to FIG. 2, the cache 210 may receive the data items requested by the widget for access by the UI components 206. Thereafter, the UI components 206 may retrieve the data items from the cache 210 for processing by the widgets during playback of a vehicle run. It will be appreciated from the foregoing example that a vehicle run involves publishing an amount of data to data topics. In some examples, for each data topic, which is to say with regards to each subset of data items of a data topic requested by a widget, portions of the subset of data items—rather than all of the subset of data items published during a run—are received into the buffer 210 at a time. As such, the cache 201 may operate as a reactive cache, buffering portions of the vehicle run data, and requesting further portions during playback of a portion currently in the cache 201.

In some examples each of the subset of data items requested by the set of widgets is stored in the cache 210 in association with a cache key. The cache key may comprise a hash of at least part of the shareable data structure, which, as described above, identifies the set of widgets in the first portion of the layout parameters. When a new widget is selected and added to the user interface, the UI components 206 may perform a lookup using the cache key in order to identify whether the subset of data items requested by the newly added widget is already present in the cache 210. This may be the case when, for example, one of the widgets currently processing vehicle log data has requested the same subset of data items as that which is to be requested by the newly added widget. That is to say, once the UI components 206 have identified the widgets currently processing in the user interface from the hash of the shareable data structure, the UI components 206 can identify the subset(s) of data items that have already been requested for the/those widget(s), and then compare these with the subset(s) of data items requested by the newly added widget. This may avoid sending requests for data that has already been received into the cache.

As explained above, the layout parameter of the URI may include portion "timelineState", which lists parameters for configuration of the timeline component. As also explained above, the cache 210 may receive the vehicle diagnostics data for playback by the timeline component 402 under control of the UI components 206. Therefore, in some examples the cache 210 holds vehicle diagnostics data and vehicle log data, for playback by the timeline component 402 and the selected widget(s) such as those shown in exemplary window portions 703a, 703b, 703c. The timeline component 402 and the selected widget(s) may be configured by the UI components 206 to playback the vehicle diagnostics data and/or vehicle log data, using the above-mentioned topic generation instance time. The UI components 206 may be configured with a playback rate, which may or may not be the same rate at which data is published to a data topic by components of the vehicle system 1002. For example, data may be published to data topics at a frequency that is dependent on the duration of the vehicle run and/or can be dependent on events during the vehicle run. In one exemplary configuration, data may be published to data topics at a rate of 200 or 100 times per second, with the result that the each of the above-mentioned topic generation instance times has a frequency of 200 or 100 times per second. The UI components 206, on the other hand, operate at least in part based on a clock frequency of underlying operating system components of client system 101. As a result, the frequency of the data topics may not align with the playback rate of the UI components 206.

In such examples, the UI components 206 may first apply a calibration process to align the earliest topic generation time instance with a local clock of the UI components 206, and then perform a binary search to identify and retrieve individual data items of a given data topic with topic generation time instances closest to the current playback time of the UI components 206. Users may additionally and/or alternatively manually step through each data item of data topic for any of the widgets via the timeline control elements 410a . . . 410d shown in FIG. 4.

In one example the UI components 206 may comprise a web application, which runs in a web browser such as Chrome™, and the cache 210 may be a browser cache. The timeline component 402 of the web application may be implemented using the Vuetify™ UI library, and the widgets may be implemented using the ThreeJS library. In one example the web application may be configured to send HTTP requests for the subset of data items requested by the widget(s). These HTTP requests may include data identifying the format in which the requested subset of data items from the data topics are to be returned to the web application. Exemplary and non-limiting formats include JSON, FlatBuffer and a proprietary data format, Binary Object Buffers (BOB), further details of which are disclosed in Applicant's co-pending U.S. patent application Ser. No. 17/446,891 and incorporated by reference herein in its entirety for all purposes. Alternatively the HTTP requests do not specify a particular format for requested subset of data items from the data topics, in which case the subset of data items may be of the format in which they are published to topics by the vehicle system 1002, to be described in more detail below. The web application may utilize plugins in order to send HTTP requests that include data identifying the format in which the requested subset of data items from the data topics are to be returned to the cache 210 for processing by the web application.

The web application may be extensible by use of visualization plugins in order to enable new widgets, which process the same or different subset(s) of data items from data topic(s) to existing widgets, to be selected and to execute via the web application. These visualization plugins may be configured to wrap around a library of plugin functions and assist in loading the data retrieved from the browser cache into the web browser and/or they may translate the incoming data items into e.g. a particular three.js scene.

In some situations, certain of the data topics may be published in accordance with a particular frame of reference. Each frame of reference maintains x, y, z, roll, pitch, yaw values of the objects that are associated with it. For example, there may be a world frame of reference, which generally speaking is the frame of reference of map objects and data topics corresponding to those map objects. The vehicle itself has a vehicle frame of reference, referred to as a base link frame. Objects such as sensors on the vehicle may also have the vehicle frame of reference since the sensors are located at a known and fixed location on the vehicle. As a result, data topics published by the sensors and by software components operating on the data topics published by the sensors (which themselves publish to data topics) may also be in the base link frame of reference.

It may be useful to transform data topics that are in different frames of reference to one of the frames of reference. For example, when a widget requests subsets of data items from different data topics, and those data topics comprise data items in different respective frames of reference, then in order to visualize the data items of the different data topics together, it is desirable to transform the data items of the different data topics into a single frame of reference. One possible approach is to transform data items of data topics in the base link frame of reference to the world frame of reference. However, this transform is unsuitable for objects that move, and this is because while the vehicle knows its location at the start of the run relative to the world frame of reference, once the vehicle starts moving, the base link of reference may change relative to the world frame of reference in a manner unknown to the world frame.

Accordingly, the UI components 206 may comprise transform software 209 that maintains a further frame of reference, referred to herein as the Odom frame of reference. The Odom frame of reference may be computed based on an odometry source of the vehicle, for example wheel odometry, visual odometry or an inertial measurement unit, each of which may publish data topics to the vehicle system 1002. As such, the transform software 209 may send requests to the first server 103 for a subset of data items of odometry data topics. The Odom frame of reference initially corresponds to the world map frame of reference and is configured with the start location of the vehicle as its origin; accordingly the transform software 209 may request a start location of the vehicle run, or it may locally obtain the start location from the subset(s) of data items for odometry data topics that are requested by the widgets. As the vehicle moves, data items of the odometry data topics are used by the transform software 209 to update a transform between the world and Odom frames of reference. Since the transform between world and Odom frames represents the offset in the vehicle's pose in the Odom frame, then when the transforms are combined to obtain the pose of the vehicle in the world frame, the correct pose of the vehicle is obtained.

In embodiments in which the UI components 206 are configured as a web application, the transform software 209 may be a service available to the widgets and may be implemented in the afore-mentioned library of plugin functions.

It will be appreciated that the UI components 206 enable different widgets, which receive different vehicle data (video data, data topics, diagnostics data) from different sources to execute in the same user interface and show different information from a particular vehicle run in that single interface. Further, the widgets may be configured to request vehicle data from more than one vehicle run and display information from the different vehicle runs in the interface. In one such example the timeline component 402 may be configured to display (a) period(s) of time that the vehicle runs overlap. In another example, such as when the vehicle runs do not overlap in time, selectable GUI elements may be provided by the widgets to enable a user to visualize vehicle data from selected vehicle runs in the interface.

At least the following usage scenarios are contemplated using the timeline component 402: (1) viewing a single vehicle run; (2) viewing two or more concurrent vehicle runs; and (3) viewing two or more non-concurrent vehicle runs. When viewing two or more concurrent vehicle runs, the timeline component 402 may be used as a common timeline to select times shared between concurrent runs. In certain examples, the timeline component 402 may include functionality to control viewing of time periods that extend beyond concurrent portions (when, for example, one vehicle run includes additional data beyond the shared concurrent portions(s)). In such examples, the timeline component 402 may include indications of time periods that are concurrently shared between components and those that are not.

When the timeline component 402 is used on nonconcurrent vehicle runs (e.g., to display vehicle runs having similar aspects but captured at different times), one or more of the vehicle runs may be time shifted such that a non-concurrent point of time between the runs is shared on timeline component 402. If the vehicle runs are captured using different time scales, one or more of the vehicle runs may be accelerated and/or decelerated in time such that the two or more vehicle runs share a common time window via timeline component 402. In this manner, the two or more non-concurrent vehicle runs can be viewed using a common timeline component 402 and manipulated as disclosed herein.

In some examples, non-current simulator runs can be determined based on certain aspects of the vehicle run. For example, runs may be concurrently visualized or otherwise analyzed using the disclosed techniques when vehicles are entering a certain intersection at a certain time of day. It is contemplated that geographic, temporal, or other criteria may be used to identify non-current runs of interest. For example, all runs dealing with a rare object being detected (e.g., a crocodile crossing a street, or a giraffe released in a city) may be concurrently displayed. In some examples, a list of matching runs may be presented to a user optionally with additional information (e.g., timestamps, environmental conditions (weather, amount of traffic, etc.), an intersection identifier, etc. The user may then select a further subset of runs to concurrently display. In examples, data can be stored in topic format via vehicle logs pertaining to run identification. For example, a characterization may be stored indicating a type of intersection. In some examples, a perception topic may store a classification of an object which may be used to find non-concurrent runs, etc. In some examples, non-current events may be selected to compare performance attributed to vehicle changes. For example, a run of a vehicle with a prior version of software may be compared to a similar run of the vehicle with a newer version of software (or other change). Users may also manually flag certain runs as being of interest to be run simultaneously using the disclosed techniques where the corresponding vehicle logs/topics may store these associations.

By providing a range of different widgets, configured to visualize different data topics along with diagnostics data and video data (to be described below), users are provided with tremendous insight not only into how a vehicle run progressed, but also how components of the vehicle system 1002, such as machine learning components, are functioning. And by creating a shareable data structure, teams of engineers can share and collectively debug vehicle components particularly efficiently. In this way the ability to test and/or otherwise debug individual components of the vehicle 1000 is significantly improved.

First Server 103

Referring back to FIG. 1, the first server 103 may be configured to receive requests for data topics and/or vehicle diagnostics data from the client system 101. The first server 103 may communicate with storage system 107, which stores the data topics that have been published by the vehicle system 1002. The storage system 107 may be configured to store the data and/or messages published from a vehicle run in a hierarchical data structure. The hierarchical data structure may organize the data and/or messages into data topics, and in association with timestamp information and other metadata, as described in Applicant's co-pending U.S. patent application Ser. No. 16/219,623, the entire contents of which are incorporated by reference herein for all purposes. In particular, a file or other data structure in the hierarchy, which may be the lowest level in the data structure, may include one or a number of messages (e.g., logs or other data) for a specific data topic. Each file may be associated with a time at which it was recorded or to which it pertains and may be less than a threshold size that serves as a limit on the size of the files. This time value may represent a second level of the data structure. In some aspects, the vehicle system 1002 may publish the data created by the vehicle 1000 in this way to enable faster, more efficient, and more precise reporting of certain data to a linked service or system, such as the client system 101 described herein. Individual message types of data topics, and indeed messages within a given message type, may be considered a data item of a data topic.

Figure 8:
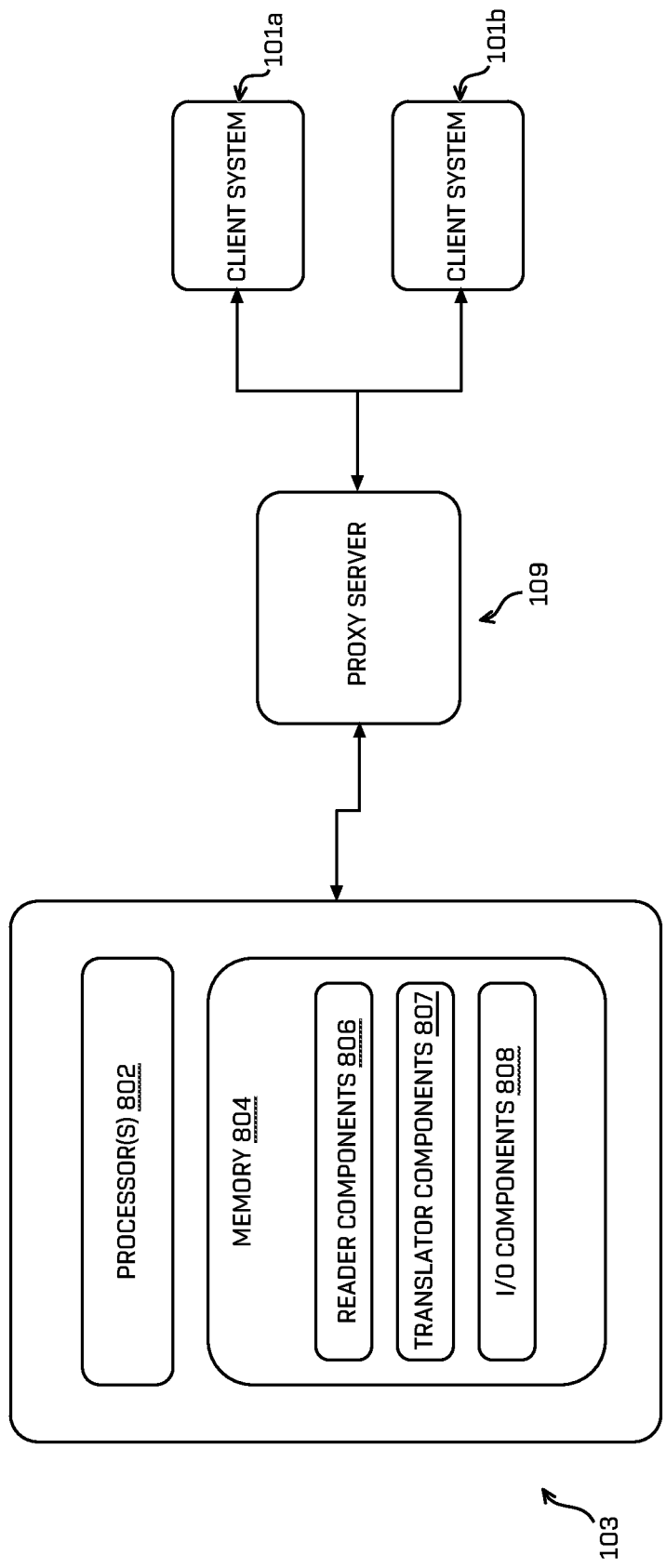
FIG. 8 is a schematic block diagram showing components of the first server of FIG. 1

Referring to FIG. 8, the first server 103 may be configured with a processor(s) 802 and a memory 804 storing I/O components 808 that enable the first server 103 to communicate with one or more client systems 101*a*, 101*b* and the storage system 107. The first server 103 also comprises reader components 806, which send requests to the storage system 107 for specific data items of certain data topic(s), namely data topics for a specific vehicle and vehicle run. As has been described above with reference to FIGS. 3-7, requests may be sent by the client system 101 and may specify e.g. a vehicle and vehicle run, and one or more subsets of data items of data topic(s). The subset(s) of data item(s) requested by the client system 101 may correspond to certain rather than all of the afore-mentioned message types and/or messages of data topics stored by the storage system 107, as described above. These may be considered whitelisted message types and/or messages of data topics. In one example the reader components 806 of the first server 103 has access to the schema underpinning storage of the data topics published by the vehicle system 1002 in the storage system 107. This enables the reader components 806 to efficiently request the whitelisted message types/messages of data topics from the storage system 107 in accordance with the subset(s) of data items that are specified in requests received from the client system 101. This enables particularly efficient identification and retrieval of vehicle log data.

In addition to specifying subset(s) of data items requested by the client system 101, incoming requests may include data identifying the format in which the requested subset of data items from the data topics are to be returned to the client system 101. Exemplary such data formats include JSON, FlatBuffer and the above-mentioned proprietary BOB format. Accordingly, the first server 103 may include translator components 807 that translate the data items(s) requested and received by the reader components 806 of the first server 103 from the native storage format of storage system 107 into the requested format and then transmits the data items(s), in the requested format, to the client system 101.

In addition to specifying subset(s) of data items requested by the client system 101, incoming requests may include data identifying a service that is required to process the content of the messages stored in the storage system 107. For example, for some data topics the messages may be stored in compressed format in the storage system 107, in which case the messages may need to be decompressed before sending back to the client system 101. In at least some examples the request from the client system 101 may specify e.g. the compression service, but in other examples the first server 103 may identify whether a, and if so what, service may be utilized prior to transmitting data topics to the client system 101.

When the UI components 206 of the client system 101 such as client system 101*a* comprise a web application, these requests may comprise HTTP requests, and the first server may be a web server 103. In this case the system 100 may include a proxy server 109, which acts as an intermediary for client requests from the client system 101 and responses to those requests from the first server 103. The proxy server 109 may cache the requested subset(s) of data items of data topics, which means that in the event that the shareable data structure described above is shared with another client system 101*b*, that other client system 101*b* can receive vehicle diagnostics data and/or vehicle log data and widget layout data in a fast and efficient manner. This enables different users of different client systems 101*a*, 101*b* to view the same vehicle diagnostics data and/or vehicle log data and collectively assess any given vehicle run.

Second Server 105

The vehicle system 1002 may comprise image sensors in the form of a vehicle camera system comprising a plurality of cameras, each of which may capture videos of a vehicle run, from which video streams can be derived. The video streams may be in a first format, for example H264, and stored as such in the storage system 107, for example in relation to vehicle log data and by time and/or by topic as described above.

In some examples at least one of the video streams may be transcoded into a second format, such as mpeg-dash, and may be stored in a cache of the storage system 107. This transcoding may occur live, in response to an event, such as a request from the client system 101. Alternatively or additionally, for certain video streams the video streams may be pre-transcoded into the second format from the first format.

In some examples, particular camera(s) of the vehicle camera system may be designated or otherwise selected as one(s) for which live transcoding and optionally pre-transcoding from the first format into the second format is desired. The particular camera(s) that may be transcoded prior to a user request may be determined based on a frequency of usage of the camera(s). For example, cameras that are more often used for generating visualizations can be transcoded ahead of a user request in order to reduce latencies associated with live transcoding. This can be balanced with memory space needed to store transcoded videos. The or these camera(s) may for example, be cameras that are positioned ahead and optionally to the side of the vehicle, but cameras in other positions, on-vehicle and off-vehicle, are contemplated. The criteria for determining which video camera to select can be based on any one or more of: a location of a camera on vehicle; a location of a vehicle in proximity to an event (e.g., a collision); a location of a vehicle relative to a highway sign (a non-protected left turn, a two-way stop at a four-way intersection); a location of a vehicle relative to a highway control (a cycle lane or a bus lane); a location of a vehicle relative to a specific type of static object in the environment (e.g. trees); a time period or time of day, or other criteria that may assist in improving the driving capabilities of autonomous vehicles.

These videos may be viewed for a variety of reasons by a variety of users and heuristics can be used to determine which are more likely to be viewed by a human, and therefore would benefit from transcoding prior to receiving a request. For example, a vehicle log/topic may include data indicating which video feeds are of interest, which are accessed more often, etc. The data of the vehicle log/topic may, for example, indicate that the run is associated with an unprotected left turn. This information can be used in conjunction with, for example, a frequency of access to the vehicle log (or similar vehicle logs) to determine which video feeds from the runs to transcode prior to a user requesting the videos. For example, vehicle logs associated with certain vehicle maneuvers may be routinely analyzed and, if so, new logs meeting the criteria for a vehicle maneuver may be transcoded in anticipation of user use. Topic-based vehicle logs may facilitate this analysis by, for example, providing a field within a topic characterizing a type of maneuver. For example, a planner component may populate a topic indicating that the vehicle is attempting the aforementioned unprotected left turn. Additional maneuvers can include passing a double-parked vehicle, progressing through a four-way intersection with two-way stop, etc.

In some examples, certain rules may be used to identify which cameras should be transcoded according to certain maneuvers. The aforementioned unprotected left turn may include cameras on the front and left of the vehicle and possibly on the right when the vehicle is turning. In some examples, a video may be transcoded in response to a certain classification of object and/or a certain mismatch in classification. For example, a classification can indicate that a rare object has been identified. Cameras that have a line of sight on the rare object may be transcoded as the vehicle moves around the rare object or vice-versa. A mismatch in classification may indicate that different sensor modalities and associated pipelines may disagree on classification or other aspects. In some examples transcoded data may be stored in the vehicle log itself for easier access and identification.

By transcoding video data from the first format into the second format for a subset (designated or otherwise selected) rather than all of the plurality of cameras, and storing the video data in the second format in a cache for that subset of cameras, the storage requirements associated with image data to be consumed by client system 101 are comparatively reduced. The cache may, for example, include data eviction rules that may interact with rules for determining which video data logs may be transcoded for later consumption. For example, a certain size of data in the cache can be reserved for forward facing cameras or camera data from certain types of revisions of vehicle. For example, a portion of the cache may be reserved for certain revisions of vehicle and within that portion, videos may be stored for certain maneuvers and/or camera locations performed by vehicles of that revision. By providing a layered approach for caching transcoded videos, a balance between recording pertinent transcoded data and avoiding costly and unnecessary over storage of videos can be achieved.

Figure 9:
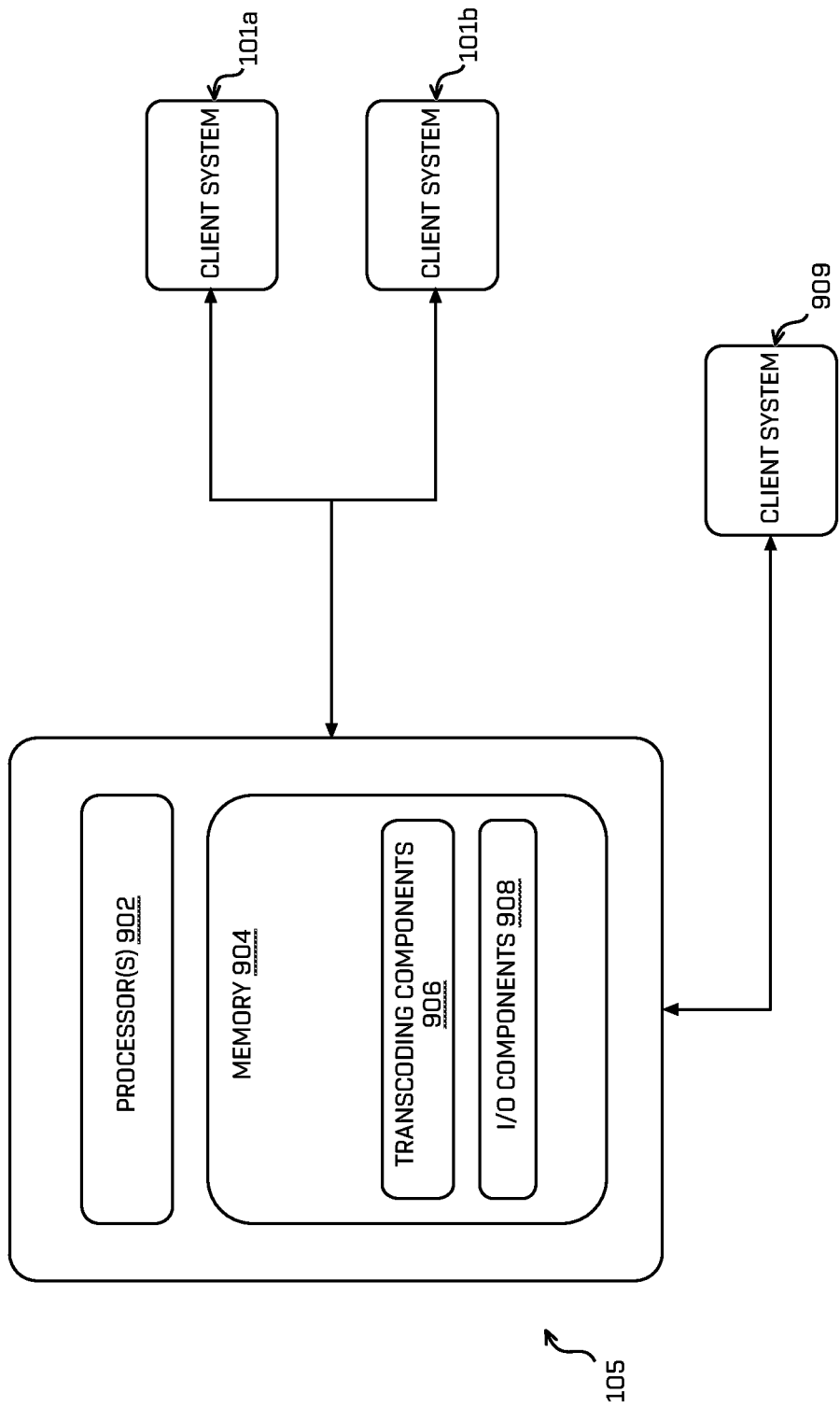
FIG. 9 is a schematic block diagram showing components of the second server of FIG. 1

Referring back to FIG. 1 and also to FIG. 9, requests for video data may be received by the second server 105, which may be configured with a processor(s) 902 and a memory 904 storing I/O components 908 that enable the second server 105 to communicate with one or more client systems 101a, 101b and the storage system 107. The second server 105 may be configured to receive requests for video data from one or more client systems 101a, 101b, as well as requests for video data from other systems such as further client system 909.

When the second server 105 identifies that a request is from a client system 101a, 101b, the second server 105 may interpret that request as one that is for video data in the second format. Alternatively, or additionally the second server 105 may identify that the request is for video data derived from one of the designated cameras of the camera system. The request may include fields identifying a vehicle, a vehicle run, and a point in time/period/time range of the vehicle run. These fields may be parsed by the second server 105 in order to send a query to the storage system 107 for video data in the second format for a specific camera or cameras of the vehicle camera system of that vehicle run for the specified point in time/period/time range of the vehicle run. The cache of the storage system 107 into which transcoded segments for certain video streams are stored may be queried to identify whether the requested video data has already been transcoded into the second format for the specified point in time/period/time range of the vehicle run. Having video data already stored in the second format avoids delays associated with live transcoding from the first format into the second format.

The request may originate from a widget executing e.g. in a web browser of the client system 101a. In at least some examples the connection between the client system(s) 101a, 101b and the second server 105 is a two-way stateful web socket connection. This connection may be set up by the I/O components 208 when a user selects a camera widget 703b via the picklist 601.

When the second server 105 identifies that a request is for video data that is stored in the first format but not in the second format for the specified point in time/period/time range of the vehicle run, the second server 105 may execute or otherwise cause the transcoding component 906 to retrieve and transcode a segment of the video stream that is stored in the first format into the second format, store the transcoded segment(s) in the cache, and transmit the segment of the video stream in the second format to the requesting client. For example, if at least part of the requested video data is not already in the cache of storage system 107 or otherwise not available in the second format, the second server 105 may execute or otherwise cause a transcoding component 906 to transcode one or more video streams stored in the first format into the second format, e.g. by means of a library. While the transcoding component 906 is shown local to the second server 105 it is to be understood that it may be a library of function provided by the storage system 107 and requested by the second server 105.

A given video stream may be stored in segments of a specified duration in the second format, so that different client systems 101*a*, 101*b*, which are for example configured with the same widget, can request and view the same video data for the specified point in time/period/time range of the vehicle run. The transcoding component 906 may monitor transmission of the transcoded video data to any one of the client systems 101*a*, 101*b* and start transcoding, into the second format, any segments that are in the first format but not in the second format, and that are within the specified time period, so there is minimal interruption and/or delay at the client system 101*a*, 101*b*. For example, 10 second segments of video data may be sent up to 30 seconds in advance of the playback time.

The requested video data in the second format may comprise mpeg-dash video data and may be received into a media buffer of the client system 101*a* under control of the I/O components 208. This media buffer is accessible by the UI components 206 as described above with regards to the cache 210, and because the video data is accompanied by time stamp data, the UI components 206 may apply the afore-mentioned calibration and binary search processes in order to identify and retrieve individual video data items with time stamp data closest to the current playback time of the UI components 206.

The further client system 909 may be a computing device configured with software components that request video data in the first format, which is to say for which transcoding into the second format by the transcoding server 105 is not required. The further client system 909 may for example be configured with suitable transcoding software into the second or different format, or transcoding may not be required. The further client system 909 may request video data from a set of the plurality of cameras of the vehicle camera system, where the set of cameras overlaps contains at least one of the designated or otherwise selected cameras for transcoding into the second format by the transcoding server. In one example the set of cameras may be all of the cameras of the vehicle camera system, which is to say it comprises all of the designated or otherwise selected cameras.

Vehicle System

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles.

Figure 10:
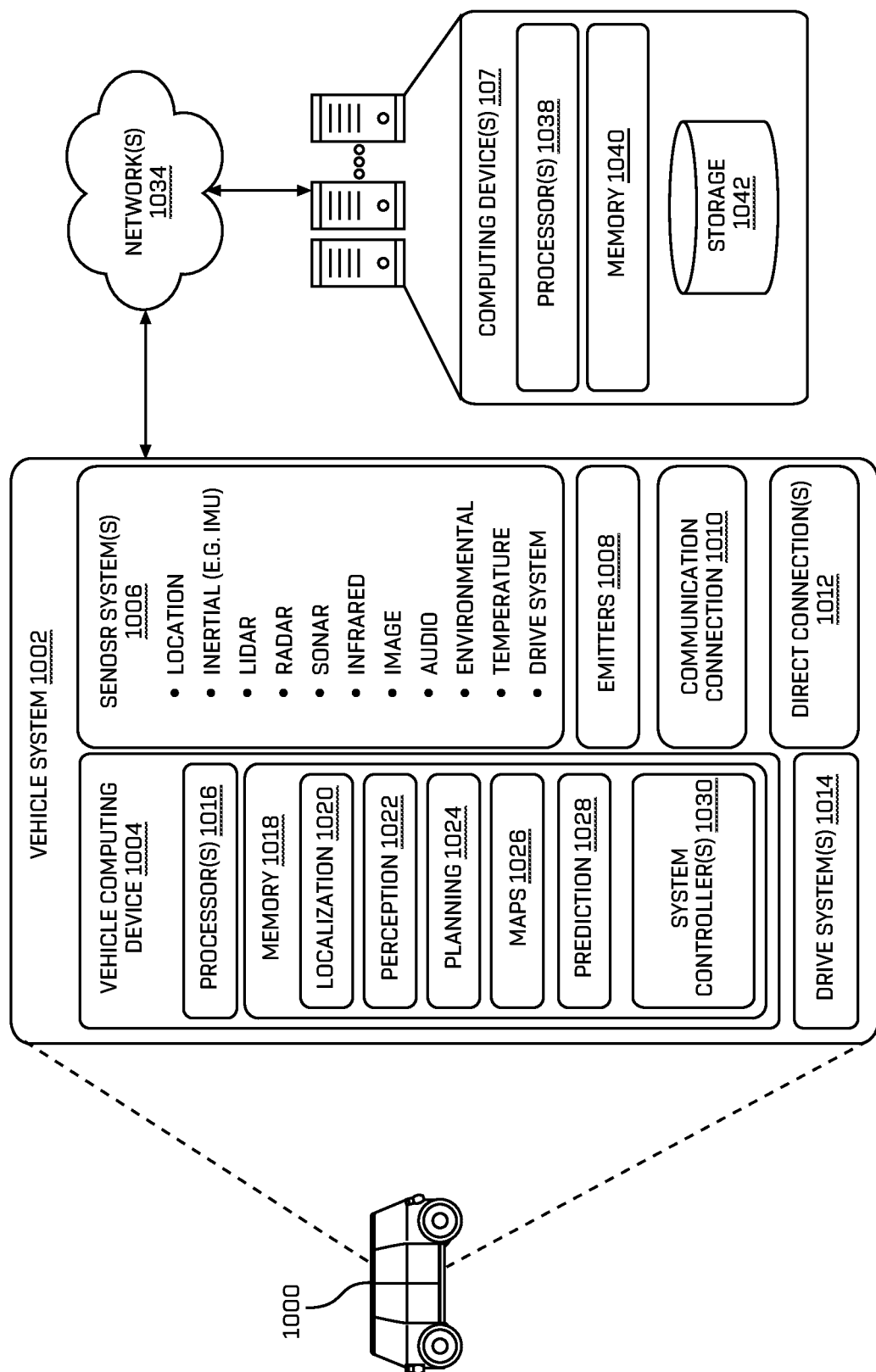
FIG. 10 is a schematic block diagram depicting a block diagram of an example vehicle system.

FIG. 10 is a block diagram of an example vehicle data logging system (alternatively referred to herein as vehicle system) 1002 that may generate vehicle log data, vehicle diagnostics data and video data for use by the techniques described herein. In the illustrated example vehicle system 1002, the vehicle 1000 is an autonomous vehicle; however, the vehicle 1000 can be any other type of vehicle, including a simulated vehicle or a combination of a physical and simulated vehicle.

The vehicle 1000 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 1000 can be configured to control all functions from start to completion of the trip, including all parking functions, it may not include a driver and/or controls for driving the vehicle 1000, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 1000 can include one or more vehicle computing devices 1004, one or more sensor systems 1006, one or more emitters 1008, one or more communication connections 1010 (also referred to as communication devices and/or modems), at least one direct connection 1012 (e.g., for physically coupling with the vehicle 1000 to exchange data and/or to provide power), and one or more drive systems 1014. The one or more sensor systems 1006 can be configured to capture sensor data associated with an environment.

The sensor system(s) 1006 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 1006 can include multiple instances of each of these or other types of sensors. For instance, the time-of-flight sensors can include individual time-of-flight sensors located at the corners, front, back, sides, and/or top of the vehicle 1000. As another example, the camera sensors can include multiple cameras disposed at various locations about the exterior and/or interior of the vehicle 1000. The sensor system(s) 1006 can provide input to the vehicle computing device(s) 1004.

The vehicle 1000 can also include emitter(s) 1008 for emitting light and/or sound. The emitter(s) 1008 in this example include interior audio and visual emitters to communicate with passengers of the vehicle 1000. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1008 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 1000 can also include communication connection(s) 1010 that enable communication between the vehicle 1000 and one or more other local or remote computing device(s) (e.g., a remote teleoperation computing device) or remote services. For instance, the communication connection(s) 1010 can facilitate communication with other local computing device(s) on the vehicle 1000 and/or the drive system(s) 1014. Also, the communication connection(s) 1010 can allow the vehicle 1000 to communicate with other nearby computing device(s) (e.g., other nearby vehicles, traffic signals, etc.).

The communications connection(s) 1010 can include physical and/or logical interfaces for connecting the vehicle computing device(s) 1004 to another computing device or one or more external networks 1034 (e.g., the Internet). For example, the communications connection(s) 1010 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 1000 can include drive system(s) 1014. In some examples, the vehicle 1000 can have a single drive system 1014. In at least one example, if the vehicle 1000 has multiple drive systems 1014, individual drive systems 1014 can be positioned on opposite ends of the vehicle 1000 (e.g., the front and the rear, etc.). In at least one example, the drive system(s) 1014 can include the sensor system(s) 1006 to detect conditions of the drive system(s) 1014 and/or the surroundings of the vehicle 1000. By way of example and not limitation, the sensor system(s) 1006 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 1014. In some cases, the sensor system(s) 1006 on the drive system(s) 1014 can overlap or supplement corresponding systems of the vehicle 1000 (e.g., sensor system(s) 1006).

The drive system(s) 1014 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1014 can include a drive system controller which can receive and preprocess data from the sensor system(s) 1006 and to control operation of the various vehicle systems. In some examples, the drive system controller can include one or more processor(s) and memory communicatively coupled with the one or more processor(s). The memory can store one or more components to perform various functionalities of the drive system(s) 1014. Furthermore, the drive system(s) 1014 also include one or more communication connection(s) that enable communication by the respective drive system with one or more other local or remote computing device(s).

The vehicle 1000 can include one or more second computing devices (not shown) to provide redundancy, error checking, and/or validation of determinations and/or commands determined by the vehicle computing device(s) 1004.

The vehicle computing device(s) 1004 can include one or more processors 1016 and memory 1018 communicatively coupled with the one or more processors 1016. In the illustrated example, the memory 1018 of the vehicle computing device(s) 1004 stores a localization component 1020, a perception component 1022, a planning component 1024, a maps component 1026, a prediction component 1028, and one or more system controllers 1030. Though depicted as residing in the memory 1018 for illustrative purposes, it is contemplated that the localization component 1020, the perception component 1022, the prediction component 1028, the planning component 1024, the maps component 1026, and the one or more system controllers 1030 can additionally, or alternatively, be accessible to the vehicle computing device(s) 1004 (e.g., stored in a different component of vehicle 1000 and/or be accessible to the vehicle 1000 (e.g., stored remotely).

In memory 1018 of the vehicle computing device 1004, the localization component 1020 can include functionality to receive data from the sensor system(s) 1006 to determine a position of the vehicle 1000. For example, the localization component 1020 can include and/or request/receive a three-dimensional map of an environment (and/or a map based on semantic objects) and can continuously determine a location of the autonomous vehicle within the map. In some instances, the localization component 1020 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 1020 can provide data to various components of the vehicle 1000 to determine an initial position of an autonomous vehicle for generating a trajectory, as discussed herein.

The perception component 1022 can include functionality to perform object detection, segmentation, and/or classification. In some examples, the perception component 1022 can provide processed sensor data that indicates a presence of an entity that is proximate to the vehicle 1000 and/or a classification of the entity as an entity type (e.g., car, pedestrian, cyclist, building, tree, road surface, curb, sidewalk, unknown, etc.). In additional or alternative examples, the perception component 1022 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 1022 can use perception algorithms to determine a perception-based bounding box associated with an object in the environment based on sensor data. For example, the perception component 1022 can receive image data and classify the image data to determine that an object is represented in the image data. Then, using detection algorithms, the perception component 1022 can generate a two-dimensional bounding box and/or a perception-based three-dimensional bounding box associated with the object. The perception component 1022 can further generate a three-dimensional bounding box associated with the object. As discussed above, the three-dimensional bounding box can provide additional information such as a location, orientation, pose, and/or size (e.g., length, width, height, etc.) associated with the object.

The perception component 1022 can include functionality to store perception data generated by the perception component 1022. In some instances, the perception component 1022 can determine a track corresponding to an object that has been classified as an object type. For purposes of illustration only, the perception component 1022, using sensor system(s) 1006 can capture one or more images of an environment. The sensor system(s) 1006 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 1000. Fused perception data can include a fusion or other combination of sensor data from sensor system(s) 1006, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 1028 can generate one or more probability maps representing prediction probabilities of possible locations of one or more objects in an environment. For example, the prediction component 1028 can generate one or more probability maps for vehicles, pedestrians, animals, and the like within a threshold distance from the vehicle 1000. In some instances, the prediction component 1028 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In at least one example, the vehicle computing device(s) 1004 can include one or more system controller(s) 1030, which can be configured to control steering, propulsion, braking, safety, emitters, communication, and other systems of the vehicle 1000. These system controller(s) 1030 can communicate with and/or control corresponding systems of the drive system(s) 1014 and/or other components of the vehicle 1000, which may be configured to operate in accordance with a path provided from the planning component 1024.

At least some of the localization component 1020, perception component 1022, planning component 1024, maps component 1026, prediction component 1028 and the sensors making up the sensor system 1006 serialize its output and publish the output to data topics for a vehicle run. The published topic data may be transmitted to the computing device 107 shown in FIG. 1.

As such the vehicle 1000 can connect to the computing device 107 shown in FIG. 1 via the network 1034. The computing device 107 can include one or more processors 1038 and memory 1040 communicatively coupled with the one or more processors 1038. In at least one instance, the one or more processors 1038 can be similar to the processor(s) 1016 and the memory 1040 can be similar to the memory 1018. In the illustrated example, the computing device 107 comprises storage 1042 into which data topics received from the vehicle system 1002 are stored. This storage 1042 may have a cache for storing video data that has been transcoded as segments in the second format as described above.

The processor(s) 1016, 1038, 202, 802, 902 can be any suitable processor capable of executing instructions to process data and perform operations as described herein. By way of example and not limitation, the processor(s) 1016, 1038, 202, 802, 902 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 1018, 1040, 204, 804, 904 are examples of non-transitory computer-readable media. The memory 1018, 1040, 204, 804, 904 can store an operating system and one or more software applications, instructions, programs, and/or data to implement the methods described herein and the functions attributed to the various systems. In various implementations, the memory 1018, 1040, 204, 804, 904 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 1018 can be implemented as a neural network. In some examples, the components in the memory 1018 may not include machine learning algorithm to reduce complexity and to be verified and/or certified from a safety standpoint.

Figure 11:
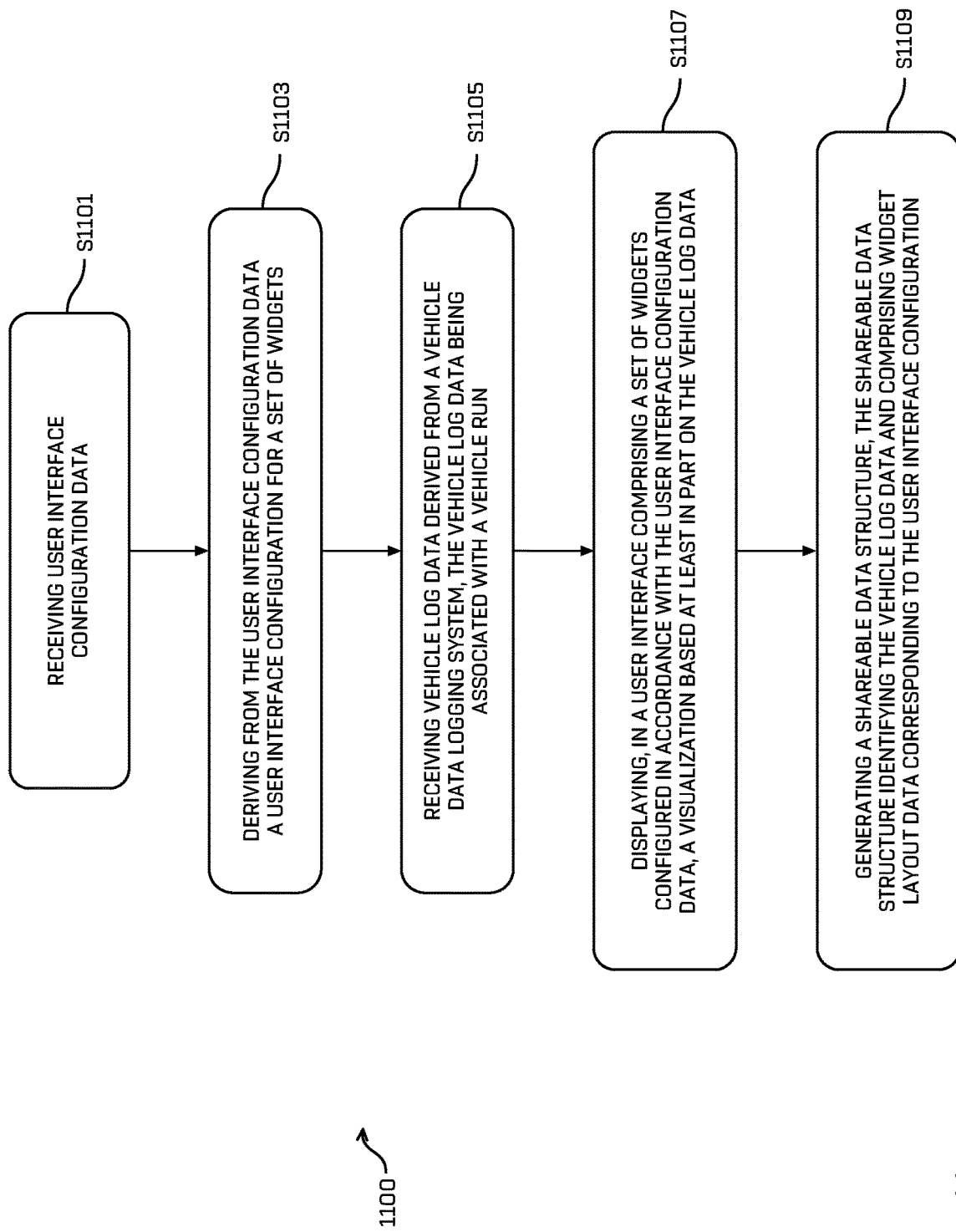
FIG. 11 is a schematic flow diagram showing certain steps performed by the client system of FIG. 1.
Figure 12:
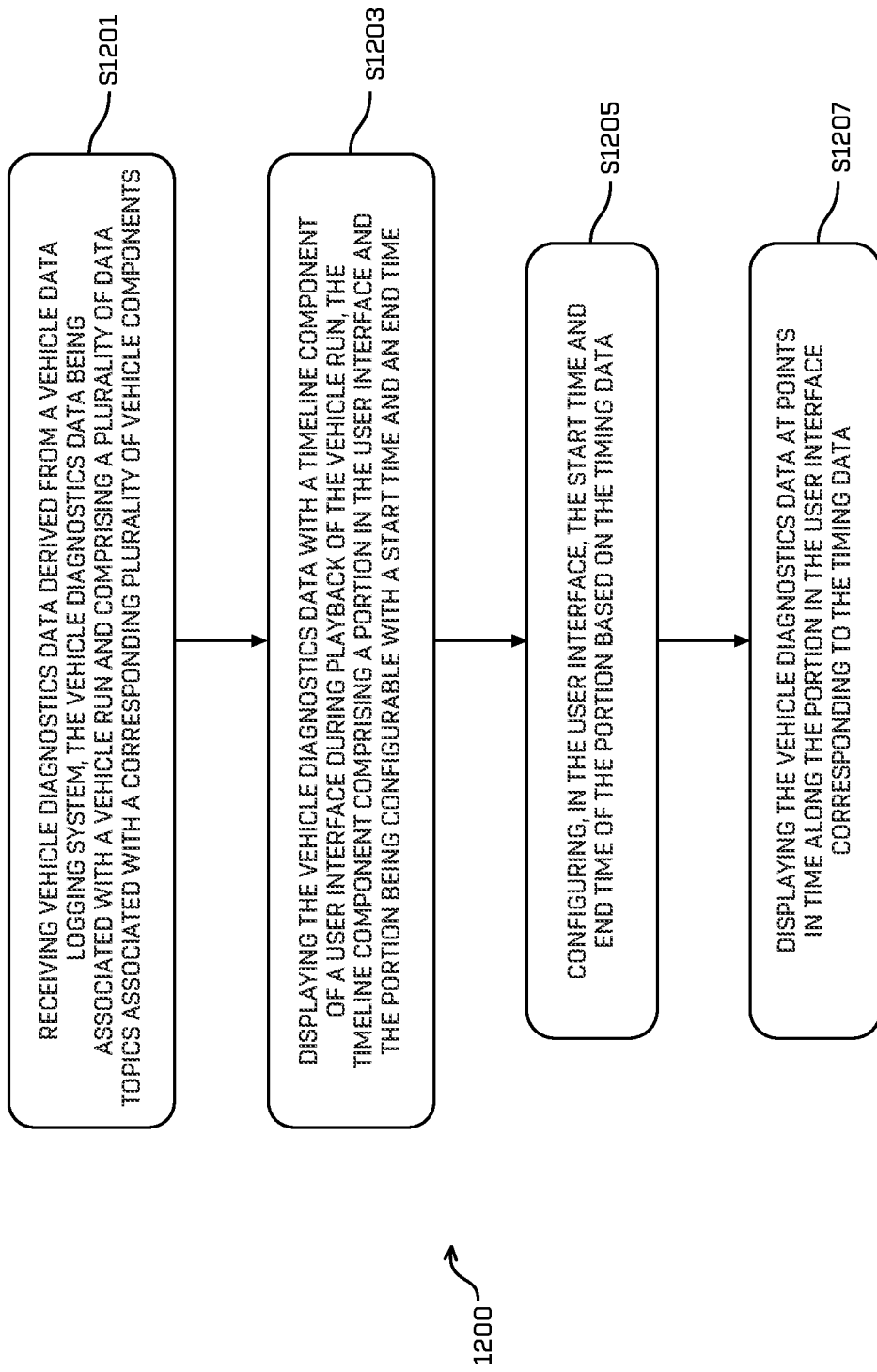
FIG. 12 is a schematic flow diagram showing certain steps performed by the client system of FIG. 1.
Figure 13:
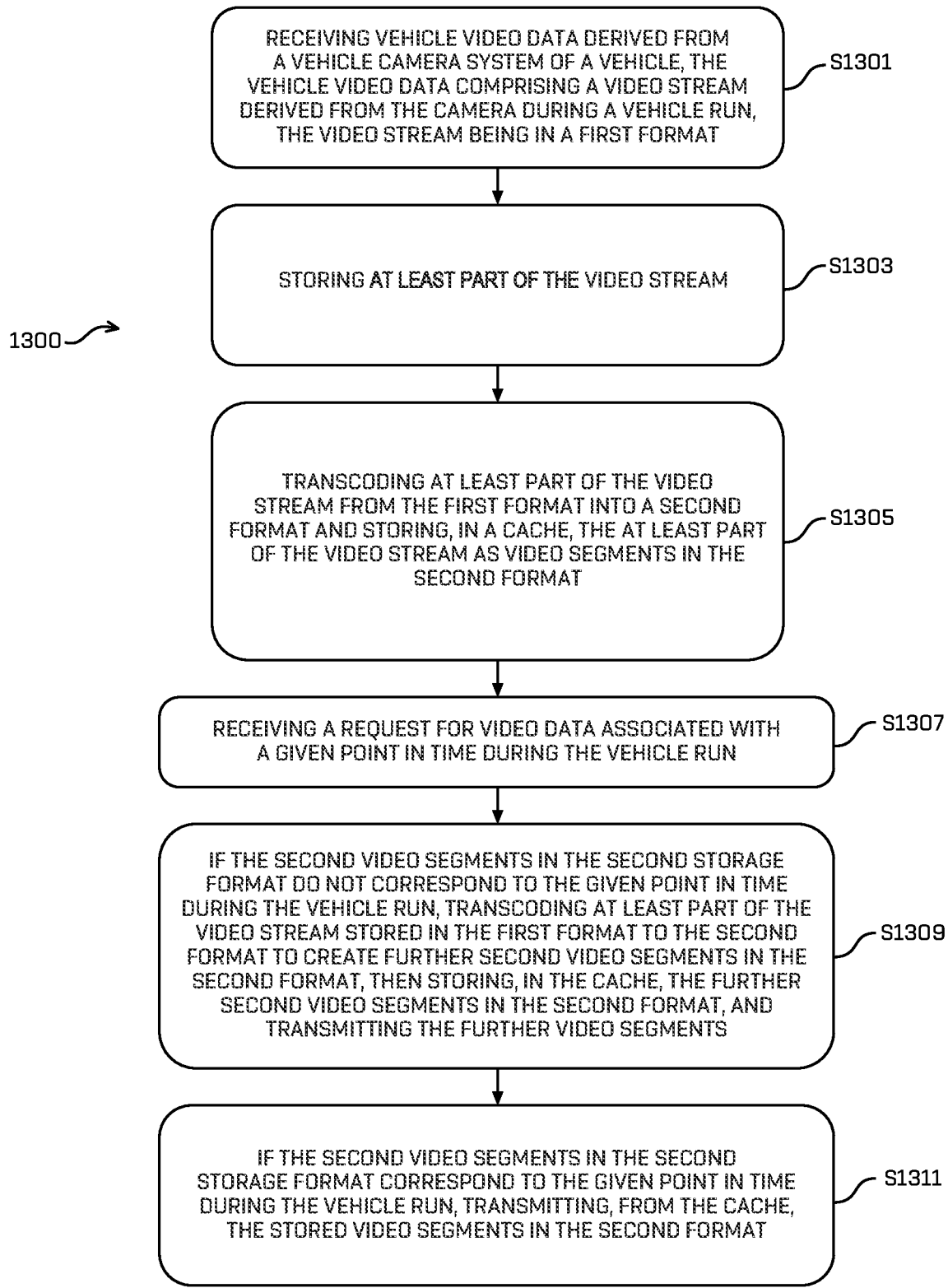
FIG. 13 is a schematic flow diagram showing certain steps performed by a server system of FIG. 1.

FIGS. 11, 12 and 13 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 11 illustrates an exemplary method 1100 performed by the client system 101 of FIG. 1. In this example the method may comprise, at step S1101, receiving user interface configuration data, and at step S1103, deriving from the user interface configuration data a user interface configuration for a set of widgets. At step S1105, the method may comprise receiving vehicle log data derived from a vehicle data logging system, the vehicle log data being associated with a vehicle run and the method may continue, at step S1107, with displaying, in a user interface comprising a set of widgets configured in accordance with the user interface configuration data, a visualization based at least in part on the vehicle log data. At step S1109, the method may comprise generating a shareable data structure, the shareable data structure identifying the vehicle log data and comprising widget layout data corresponding to the user interface configuration.

FIG. 12 illustrates another exemplary method 1200 performed by the client system 101 of FIG. 1. In this example the method may comprise, at step S1201, receiving vehicle diagnostics data derived from a vehicle data logging system, the vehicle diagnostics data being associated with a vehicle run and comprising a plurality of data topics associated with a corresponding plurality of vehicle components. At step S1203, the method may comprise displaying the vehicle diagnostics data with a timeline component of a user interface during playback of the vehicle run, the timeline component comprising a portion in the user interface and the portion being configurable with a start time and an end time. The displaying step S1203 may involve configuring, in the user interface, the start time and end time of the portion based on the timing data (step S1205) and displaying the vehicle diagnostics data at points in time along the portion in the user interface corresponding to the timing data (step S1207).

FIG. 13 illustrates an exemplary method 1300 performed by a server system such as transcoding server 105 of FIG. 1. In this example the method may comprise, at step S1301, receiving vehicle video data derived from a vehicle camera system of a vehicle, the vehicle video data comprising a video stream derived from the camera during a vehicle run, the video stream being in a first format. At step S1303, the method may comprise storing at least part of the video stream, and at step S1305, transcoding at least part of the video stream from the first format into a second format and storing, in a cache, the at least part of the video stream as video segments in the second format. A request may be received (step S1307) for video data associated with a given point in time during the vehicle run. If the second video segments in the second format do not correspond to the given point in time during the vehicle run, the method may comprise, at step S1309, transcoding at least part of the video stream stored in the first format to the second format to create further second video segments in the second format, then storing, in the cache, the further second video segments in the second format, and transmitting the further video segments. If the second video segments in the second format do correspond to the given point in time during the vehicle run, the method may comprise, at step S1311 transmitting, from the cache, the stored video segments in the second format.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A: A system, comprising: one or more processors; and non-transitory computer readable media including instructions that, when executed by the one or more processors, cause the system to perform operations comprising: receiving vehicle diagnostics data derived from a vehicle data logging system, the vehicle diagnostics data being associated with a vehicle run and comprising a plurality of data topics associated with a corresponding plurality of vehicle components; and displaying the vehicle diagnostics data with a timeline component of a user interface during playback of the vehicle run, the timeline component comprising a portion in the user interface and the portion being configurable with a start time and an end time, wherein the vehicle diagnostics data comprises timing data for at least one of the data topics and the displaying comprises: configuring, by the timeline component, the start time and end time of the portion in the user interface based on the timing data; and displaying the vehicle diagnostics data at points in time along the portion in the user interface corresponding to the timing data, wherein the plurality of data topics include a hierarchical data topic including higher-level diagnostics data from the hierarchical data topic and lower-level diagnostics data from the hierarchical data topic, and wherein the timeline component comprises a main timeline part, the main timeline part configured to display the higher-level diagnostics data, and a subsidiary timeline part, the subsidiary timeline part for displaying the lower-level diagnostics data.

B: A system as clause A describes, wherein the non-transitory computer readable media include instructions that, when executed by the one or more processors, cause the system to perform operations comprising: receiving vehicle state data, the vehicle state data including manually generated events generated by an assistance operator associated with the vehicle during the vehicle run and wherein the timeline components includes an event timeline part in which events relating to the vehicle run are displayed.

C: A system as clause A or clause B describe, wherein the user interface comprises a set of widgets, the widgets visualizing logged data from the vehicle run, wherein the instructions that cause the system to playback the vehicle run includes instructions that, when executed by the one or more processors, cause the system to display the diagnostics data in the timeline component and playback of the logged data in the set of widgets, the display of the diagnostics data in the timeline component and the playback of the logged data in the set of widgets being synchronized.

D: A computer-implemented method, comprising: receiving vehicle data derived from a vehicle data logging system, the vehicle data being associated with a vehicle run and comprising a plurality of data topics associated with a corresponding plurality of vehicle components; and displaying the vehicle data with a timeline component of a user interface during playback of the vehicle run, the timeline component comprising a portion in the user interface and the portion having a start time and an end time, wherein the vehicle data comprises timing data for at least one of the data topics and the displaying comprises: configuring, in the user interface, the start time and end time of the portion; displaying the vehicle data at points in time along the portion in the user interface corresponding to the timing data.

E: A method as clause D describes, wherein the plurality of data topics include a hierarchical data topic including higher-level diagnostics data from the hierarchical data topic and lower-level diagnostics data from the hierarchical data topic, and wherein the timeline component comprises a main timeline part, the main timeline part configured to display the higher-level diagnostics data, and a subsidiary timeline part, the subsidiary timeline part for displaying the lower-level diagnostics data.

F: A method as clause E describes, wherein the higher-level and lower-level diagnostics data relate to the same vehicle component.

G: A method as clause E describes, comprising: retrieving, from a store accessible by the user interface and into which the hierarchical data topic are received, the higher-level diagnostics data; and processing the higher-level diagnostics data during playback of the vehicle run.

H: A method as clause G describes, comprising: selectively retrieving, from the store, the lower-level diagnostics data in response to user input; and displaying the retrieved lower-level diagnostics data in the subsidiary timeline part.

I: A method as any of clause E to clause H describes, comprising displaying the vehicle data in the timeline component via a web browser during playback of a vehicle run; storing the vehicle data in a browser cache; and storing the vehicle data in a browser cache, wherein, in response to user input, the lower-level diagnostics data is selectively retrieved from the browser cache and displayed in the subsidiary timeline part.

J: A method as clause D describes, wherein the plurality of data topics include a first data topic and a second data topic, and the method comprises: displaying the first data topic in a first section of the main timeline part and the second data topic in a second section of the main timeline part, the first and second sections being vertically aligned in the portion of the user interface.

K: A method as any of clause D to clause J describes, comprising: receiving vehicle state data, the vehicle state data including manually generated events generated by an assistance operator associated with the vehicle during the vehicle run and wherein the timeline component includes an event timeline part in which events relating to the vehicle run are displayed.

L: A method as any of clause D to clause K describes, comprising: receiving the vehicle data from remote storage in response to playback of the vehicle run.

M: A method as clause L describes, wherein a given data topic is logged at topic data generation time instances, the playback is performed at playback time instances separated by fixed time intervals at a predetermined frequency, and the method comprises selecting data from a data topic at a topic data generation time instance which is different than the current playback time instance.

N: A method as clause L describes, wherein the topic data generation time instance of the selected data is proximate in time to the current playback time instance.

O: A method as clause D describes, wherein the user interface comprises a set of widgets for visualizing logged data from the vehicle run, the method comprising: displaying the vehicle data in the timeline component; and displaying playback of the logged data in the set of widgets, wherein the display of the vehicle data in the timeline component and the playback of the logged data in the set of widgets is synchronized.

P: A method as clause O describes, wherein the logged data includes the vehicle data and the set of widgets include a diagnostics widget.

Q: A method as any of clause D to clause P describes, comprising generating a shareable data structure, the shareable data structure identifying the vehicle data and comprising timeline layout data corresponding to the configuration, in the user interface.

R: A method as clause Q describes, wherein the user interface comprises a set of widgets for visualizing logged data from the vehicle run, the method comprising: displaying the vehicle data in the timeline component; and causing playback, by the set of widgets, of the logged data, wherein the shareable data structure identifies the logged data and a layout for the widgets.

S: One or more non-transitory computer-readable media storing instructions executable by one or more processors, wherein the instructions, when executed, cause the one or more processors to perform operations comprising: receiving vehicle data derived from a vehicle data logging system, the vehicle data being associated with a vehicle run and comprising a plurality of data topics associated with a corresponding plurality of vehicle components; and displaying the vehicle data with a timeline component of a user interface during playback of the vehicle run, the timeline component comprising a portion in the user interface and the portion being configurable with a start time and an end time, wherein the vehicle data comprises timing data for at least one of the data topics and the displaying comprises: configuring, in the user interface, the start time and end time of the portion; displaying the vehicle data at points in time along the portion in the user interface corresponding to the timing data.

T: The non-transitory computer-readable media as clause R describes, wherein the plurality of data topics include a first data topic and a second data topic, and wherein the non-transitory computer readable media includes instructions that, when executed by the one or more processors, cause the system to perform operations comprising: displaying the first data topic in a first section of the main timeline part and the second data topic in a second section of the main timeline part, the first and second sections being aligned in the portion of the user interface.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system, comprising:
    one or more processors; and
    non-transitory computer readable media including instructions that, when executed by the one or more processors, cause the system to perform operations comprising:
        receiving vehicle diagnostics data derived from a vehicle data logging system, the vehicle diagnostics data being associated with a vehicle run and comprising a plurality of data topics associated with a corresponding plurality of vehicle components; and
        displaying the vehicle diagnostics data with a timeline component of a user interface during playback of the vehicle run, the timeline component comprising a portion in the user interface and the portion being configurable with a start time and an end time,
    wherein the vehicle diagnostics data comprises timing data for at least one of the data topics and the displaying comprises:
        configuring, by the timeline component, the start time and end time of the portion in the user interface based on the timing data; and
        displaying the vehicle diagnostics data at points in time along the portion in the user interface corresponding to the timing data,
    wherein the plurality of data topics include a data topic arranged in a hierarchical structure comprising a plurality of levels of diagnostic data, the data topic including first level diagnostics data and second level diagnostics data, wherein the first level is higher in the hierarchical structure than the second level,
    wherein the timeline component comprises a main timeline part, the main timeline part configured to display the higher-level diagnostics data, and a subsidiary timeline part, the subsidiary timeline part for displaying the lower-level diagnostics data; and
    wherein the user interface comprises a set of widgets, the widgets visualizing logged data from the vehicle run, wherein the instructions that cause the system to playback the vehicle run includes instructions that, when executed by the one or more processors, cause the system to display the diagnostics data in the timeline component and playback of the logged data in the set of widgets, the display of the diagnostics data in the timeline component and the playback of the logged data in the set of widgets being synchronized.

2. The system of claim 1, wherein the non-transitory computer readable media include instructions that, when executed by the one or more processors, cause the system to perform operations comprising:
    receiving vehicle state data, the vehicle state data including manually generated events generated by an assistance operator associated with the vehicle during the vehicle run and wherein the timeline components includes an event timeline part in which events relating to the vehicle run are displayed.

3. A computer-implemented method, comprising:
    receiving vehicle data derived from a vehicle data logging system, the vehicle data being associated with a vehicle run and comprising a plurality of data topics associated with a corresponding plurality of vehicle components; and
    displaying the vehicle data in a timeline component of a user interface during playback of the vehicle run, the timeline component comprising a portion in the user interface and the portion having a start time and an end time, and the user interface comprising a set of widgets for visualizing logged data from the vehicle run,
    wherein the vehicle data comprises timing data for at least one of the data topics and the displaying comprises:
        configuring, in the user interface, the start time and end time of the portion;
        displaying the vehicle data at points in time along the portion in the user interface corresponding to the timing data; and
        displaying playback of the logged data in the set of widgets, wherein the display of the vehicle data in the timeline component and the playback of the logged data in the set of widgets is synchronized.

4. The computer-implemented method of claim 3, wherein the plurality of data topics include a data topic arranged in a hierarchical structure comprising a plurality of levels of diagnostic data, the data topic including first level diagnostics data and second level diagnostics data, wherein the first level is higher in the hierarchical structure than the second level, and wherein the timeline component comprises a main timeline part, the main timeline part configured to display the higher-level diagnostics data, and a subsidiary timeline part, the subsidiary timeline part for displaying the lower-level diagnostics data.

5. The computer-implemented method of claim 4, wherein the first level diagnostics data and second level diagnostics data relate to the same vehicle component.

6. The computer-implemented method of claim 4, comprising:
retrieving, from a store accessible by the user interface and into which the hierarchical data topic are received, the first level diagnostics data; and
processing the first level diagnostics data during playback of the vehicle run.

7. The computer-implemented method of claim 6, comprising:
selectively retrieving, from the store, the second level diagnostics data in response to user input; and
displaying the retrieved second level diagnostics data in the subsidiary timeline part.

8. The computer-implemented method of claim 4, comprising:
displaying the vehicle data in the timeline component via a web browser during playback of a vehicle run; and
storing the vehicle data in a browser cache,
wherein, in response to user input, the second level diagnostics data is selectively retrieved from the browser cache and displayed in the subsidiary timeline part.

9. The computer-implemented method of claim 3, wherein the plurality of data topics include a first data topic and a second data topic, and the method comprises:
displaying the first data topic in a first section of the main timeline part and the second data topic in a second section of the main timeline part, the first and second sections being vertically aligned in the portion of the user interface.

10. The computer-implemented method of claim 3, comprising:
receiving vehicle state data, the vehicle state data including manually generated events generated by an assistance operator associated with the vehicle during the vehicle run and wherein the timeline component includes an event timeline part in which events relating to the vehicle run are displayed.

11. The computer-implemented method of claim 3, comprising:
receiving the vehicle data from remote storage in response to playback of the vehicle run.

12. The computer-implemented method of claim 3, wherein a given data topic is logged at topic data generation time instances, the playback is performed at playback time instances separated by fixed time intervals at a predetermined frequency, and the method comprises selecting data from a data topic at a topic data generation time instance which is different than the current playback time instance.

13. The computer-implemented method of claim 12, wherein
the topic data generation time instance of the selected data is a closest topic data generation time instance of the topic data generation time instances to the current playback time instance.

14. The computer-implemented method of claim 3, wherein
the logged data includes the vehicle data and the set of widgets include a diagnostics widget.

15. The computer-implemented method of claim 3, comprising generating a shareable data structure, the shareable data structure identifying the vehicle data and comprising timeline layout data corresponding to the configuration, in the user interface.

16. The computer-implemented method of claim 15, wherein the user interface comprises a set of widgets for visualizing logged data from the vehicle run, the method comprising:
displaying the vehicle data in the timeline component; and
causing playback, by the set of widgets, of the logged data,
wherein the shareable data structure identifies the logged data and a layout for the widgets.

17. One or more non-transitory computer-readable media storing instructions executable by one or more processors, wherein the instructions, when executed, cause the one or more processors to perform operations comprising:
receiving vehicle data derived from a vehicle data logging system, the vehicle data being associated with a vehicle run and comprising a plurality of data topics associated with a corresponding plurality of vehicle components; and
displaying the vehicle data in a timeline component of a user interface during playback of the vehicle run, the timeline component comprising a portion in the user interface and the portion being configurable with a start time and an end time, and the user interface comprising a set of widgets for visualizing logged data from the vehicle run,
wherein the vehicle data comprises timing data for at least one of the data topics and the displaying comprises:
configuring, in the user interface, the start time and end time of the portion;
displaying the vehicle data at points in time along the portion in the user interface corresponding to the timing data; and
displaying playback of the logged data in the set of widgets,
wherein the display of the vehicle data in the timeline component and the playback of the logged data in the set of widgets is synchronized.

18. The one or more non-transitory computer-readable media according to claim 17, wherein the plurality of data topics include a first data topic and a second data topic, and wherein the non-transitory computer readable media includes instructions that, when executed by the one or more processors, cause the system to perform operations comprising:
displaying the first data topic in a first section of the main timeline part and the second data topic in a second section of the main timeline part, and
the first and second sections being aligned in the portion of the user interface.

* * * * *